(12) United States Patent
De Luca et al.

(10) Patent No.: US 9,143,843 B2
(45) Date of Patent: Sep. 22, 2015

(54) AUTOMATED MONITORING AND CONTROL OF SAFETY IN A PRODUCTION AREA

(75) Inventors: Nicholas De Luca, Washington, DC (US); Koichi Sato, Saratoga, CA (US)

(73) Assignee: Sealed Air Corporation, Duncan, SC (US)

( * ) Notice: Subject to any disclaimer, the term of this patent is extended or adjusted under 35 U.S.C. 154(b) by 1071 days.

(21) Appl. No.: 12/928,361

(22) Filed: Dec. 9, 2010

(65) Prior Publication Data

US 2012/0146789 A1 Jun. 14, 2012

(51) Int. Cl.
- G08B 1/08 (2006.01)
- G08B 21/00 (2006.01)
- H04Q 9/02 (2006.01)
- H04N 3/38 (2006.01)

(Continued)

(52) U.S. Cl.
CPC .............. *H04Q 9/02* (2013.01); *G06K 9/00228* (2013.01); *G06K 9/00281* (2013.01); *G06K 9/00362* (2013.01); *G06K 9/00771* (2013.01); *G06Q 10/08* (2013.01); *G08B 21/12* (2013.01); *G08B 21/24* (2013.01); *H04N 3/38* (2013.01); *H04N 9/083* (2013.01); *H04W 64/00* (2013.01); *H04Q 2209/47* (2013.01); *H04Q 2209/845* (2013.01)

(58) Field of Classification Search
CPC .......... G06Q 10/08; G08B 21/22; G08B 3/10; G07C 9/00111; H04W 64/00; G06T 7/0042; G06T 2207/10016; G06K 9/036; A61B 1/041; B07C 5/10
USPC ......... 340/573.1, 539.13, 539.11, 686.6, 540, 340/10.1; 348/77, 94, 156; 382/182, 286, 382/291, 103; 701/2, 25, 50, 300
See application file for complete search history.

(56) References Cited

U.S. PATENT DOCUMENTS

| 4,947,094 A | * | 8/1990 | Dyer et al. | ............. 318/587 |
| 5,023,597 A | | 6/1991 | Salisbury | |

(Continued)

FOREIGN PATENT DOCUMENTS

| EP | 1 939 811 A1 | 7/2008 |
| KR | 100 789 721 B1 | 2/2007 |

(Continued)

OTHER PUBLICATIONS

Hydra: Multiple People detection and Tracking Using Silhouettes, Haritaoglu et al, Computer Vision Laboratory, University of MD, 6 pages (1999).

(Continued)

*Primary Examiner* — Hoi Lau
(74) *Attorney, Agent, or Firm* — Schwabe, Williamson & Wyatt

(57) ABSTRACT

A machine vision process monitors and controls safe working practice in a production area by capturing and processing image data relative to personal protective equipment (PPE) worn by individuals, movement of various articles, and movement-related conformations of individuals and other objects in the production area. The data is analyzed to determine whether there is a violation of a predetermined minimum threshold image, movement, or conformation value for a predetermined threshold period of time. The determination of a safety violation triggers computer activation of a safety control device. The process is carried out using a system including an image data capturing device, a computer and computer-readable program code, and a safety control device.

28 Claims, 10 Drawing Sheets

(51) Int. Cl.

| | | |
|---|---|---|
| H04N 9/083 | (2006.01) | |
| G06Q 10/08 | (2012.01) | |
| H04W 64/00 | (2009.01) | |
| G08B 21/12 | (2006.01) | |
| G08B 21/24 | (2006.01) | |
| G06K 9/00 | (2006.01) | |

(56) References Cited

U.S. PATENT DOCUMENTS

| | | |
|---|---|---|
| 5,164,707 A | 11/1992 | Rasmussen et al. |
| 5,305,390 A | 4/1994 | Frey et al. |
| 5,465,115 A | 11/1995 | Conrad et al. |
| 5,781,650 A | 7/1998 | Lobo et al. |
| 5,973,732 A | 10/1999 | Guthrie |
| 6,104,966 A | 8/2000 | Haagensen |
| 6,166,729 A | 12/2000 | Acosta et al. |
| 6,208,260 B1 | 3/2001 | West et al. |
| 6,283,860 B1 | 9/2001 | Lyons et al. |
| 6,392,546 B1 | 5/2002 | Smith |
| 6,414,606 B1* | 7/2002 | Yujiri et al. ............. 340/901 |
| 6,600,475 B2 | 7/2003 | Gutta et al. |
| 6,650,242 B2 | 11/2003 | Clerk et al. |
| 6,697,104 B1 | 2/2004 | Yakobi et al. |
| 6,853,303 B2 | 2/2005 | Chen et al. |
| 6,970,574 B1 | 11/2005 | Johnson |
| 7,015,816 B2 | 3/2006 | Wildman et al. |
| 7,019,652 B2 | 3/2006 | Richardson |
| 7,065,645 B2 | 6/2006 | Teicher |
| 7,317,830 B1 | 1/2008 | Gordon |
| 7,319,399 B2 | 1/2008 | Berg |
| 7,375,640 B1 | 5/2008 | Plost |
| 7,464,001 B1 | 12/2008 | Adams |
| 7,495,569 B2 | 2/2009 | Pittz |
| 7,534,005 B1 | 5/2009 | Buckman |
| 7,689,465 B1 | 3/2010 | Shakes et al. |
| 7,832,396 B2 | 11/2010 | Abernethy |
| 8,208,681 B2 | 6/2012 | Heller et al. |
| 8,249,910 B2* | 8/2012 | Wellman et al. ............ 705/7.26 |
| 8,279,277 B2 | 10/2012 | Nam et al. |
| 8,314,686 B2* | 11/2012 | Kirtley, Jr. ............ 340/10.1 |
| 8,346,468 B2* | 1/2013 | Emanuel et al. ............ 701/301 |
| 8,381,982 B2* | 2/2013 | Kunzig et al. ............ 235/462.08 |
| 8,565,913 B2* | 10/2013 | Emanuel et al. ............ 700/229 |
| 8,583,314 B2* | 11/2013 | de Oliveira et al. ......... 701/29.5 |
| 2002/0175825 A1* | 11/2002 | Clerk et al. ............ 340/686.6 |
| 2002/0190866 A1 | 12/2002 | Richardson |
| 2003/0058111 A1 | 3/2003 | Lee et al. |
| 2003/0061005 A1 | 3/2003 | Manegold et al. |
| 2003/0093200 A1 | 5/2003 | Gutta et al. |
| 2003/0163827 A1 | 8/2003 | Purpura |
| 2003/0169906 A1 | 9/2003 | Gokturk et al. |
| 2003/0184649 A1 | 10/2003 | Mann |
| 2004/0083025 A1* | 4/2004 | Yamanouchi et al. ........ 700/213 |
| 2004/0098146 A1* | 5/2004 | Katae et al. ............ 700/50 |
| 2005/0027618 A1 | 2/2005 | Zucker et al. |
| 2005/0094879 A1 | 5/2005 | Harville |
| 2005/0248461 A1 | 11/2005 | Lane et al. |
| 2006/0033625 A1 | 2/2006 | Johnson et al. |
| 2006/0061469 A1* | 3/2006 | Jaeger et al. ............ 340/539.13 |
| 2006/0106742 A1* | 5/2006 | Bochicchio et al. ......... 705/414 |
| 2006/0219961 A1 | 10/2006 | Ross et al. |
| 2006/0220787 A1 | 10/2006 | Turner et al. |
| 2006/0244589 A1 | 11/2006 | Schranz |
| 2006/0272361 A1 | 12/2006 | Snodgrass |
| 2007/0018836 A1 | 1/2007 | Richardson |
| 2007/0069907 A1* | 3/2007 | Magens et al. ............ 340/679 |
| 2007/0073439 A1* | 3/2007 | Habibi et al. ............ 700/213 |
| 2007/0122005 A1 | 5/2007 | Kage et al. |
| 2007/0247316 A1* | 10/2007 | Wildman et al. ........... 340/572.4 |
| 2007/0268685 A1* | 11/2007 | Fossier et al. ............ 362/135 |
| 2007/0279214 A1* | 12/2007 | Buehler ............ 340/521 |
| 2008/0001763 A1 | 1/2008 | Raja et al. |
| 2008/0011554 A1* | 1/2008 | Broesel et al. ............ 187/224 |
| 2008/0031838 A1 | 2/2008 | Bolling |
| 2008/0051952 A1* | 2/2008 | Tushaus ............ 701/25 |
| 2008/0136649 A1 | 6/2008 | Van De Hey |
| 2008/0189142 A1 | 8/2008 | Brown et al. |
| 2008/0189783 A1 | 8/2008 | Music et al. |
| 2008/0247609 A1 | 10/2008 | Feris et al. |
| 2009/0040014 A1 | 2/2009 | Knopf et al. |
| 2009/0051545 A1 | 2/2009 | Koblasz |
| 2009/0059004 A1* | 3/2009 | Bochicchio ............ 348/148 |
| 2009/0079822 A1 | 3/2009 | Yoo et al. |
| 2009/0082968 A1* | 3/2009 | Tanaka et al. ............ 701/300 |
| 2009/0114485 A1* | 5/2009 | Eggert ............ 187/394 |
| 2009/0128311 A1 | 5/2009 | Nishimura et al. |
| 2009/0135009 A1 | 5/2009 | Little et al. |
| 2009/0161918 A1 | 6/2009 | Heller et al. |
| 2009/0195382 A1 | 8/2009 | Hall |
| 2009/0224868 A1 | 9/2009 | Liu et al. |
| 2009/0224924 A1 | 9/2009 | Thorp |
| 2009/0237499 A1 | 9/2009 | Kressel et al. |
| 2009/0256751 A1* | 10/2009 | Zeller et al. ............ 342/463 |
| 2009/0273477 A1 | 11/2009 | Barnhill |
| 2009/0303035 A1* | 12/2009 | Kirtley, Jr. ............ 340/539.11 |
| 2010/0057592 A1* | 3/2010 | Moir et al. ............ 705/29 |
| 2010/0057593 A1* | 3/2010 | Moir et al. ............ 705/29 |
| 2010/0061595 A1* | 3/2010 | Baan et al. ............ 382/103 |
| 2010/0121540 A1* | 5/2010 | Kumagai et al. ............ 701/50 |
| 2010/0155416 A1 | 6/2010 | Johnson |
| 2010/0157062 A1* | 6/2010 | Baba et al. ............ 348/156 |
| 2010/0167248 A1 | 7/2010 | Ryan |
| 2010/0183218 A1 | 7/2010 | Naito et al. |
| 2010/0245554 A1 | 9/2010 | Nam et al. |
| 2011/0010023 A1* | 1/2011 | Kunzig et al. ............ 701/2 |
| 2011/0130893 A1* | 6/2011 | Gilleland et al. ............ 701/2 |
| 2011/0148581 A1* | 6/2011 | Chamseddine et al. ..... 340/10.1 |
| 2011/0205024 A1* | 8/2011 | Sogabe ............ 340/10.1 |
| 2011/0285593 A1* | 11/2011 | Cavirani et al. ............ 342/457 |
| 2012/0062725 A1 | 3/2012 | Wampler et al. |
| 2012/0123614 A1* | 5/2012 | Laws et al. ............ 701/2 |
| 2012/0146789 A1 | 6/2012 | De Luca et al. |

FOREIGN PATENT DOCUMENTS

| | | |
|---|---|---|
| WO | 99/32959 | 7/1999 |
| WO | 2007/090470 A1 | 8/2007 |
| WO | 2007/129289 A1 | 11/2007 |
| WO | 2008/152433 A1 | 12/2008 |
| WO | 2010/026581 A2 | 11/2010 |

OTHER PUBLICATIONS

Face and Hand Gesture Recognition Using Hybrid Classifiers, Gutta et al, Dept. of Computer Science, George Mason University, 6 pages (1996).

Maximum Likelihood Face Detection, Colmenarez et al, University of ILL, 4 pages, (1996).

Video Sequence Interpretation for Visual Surveillance, Rota et al, pp. 1-9 (2000).

A Line-Scan Computer Vision Algorithm for Identifying Human Body Features, Lyons et al, Philips Research, pp. 1-8 (1999).

Application of the Self-Organizing Map to Trajectory Classification, Owens et al, School of Computing and Engineering Technology, University of Sunderland, pp. 1-7 (2000).

Detecting Human Faces in Color Images, Yang et al, Beckman Institute and Department of Electrical and Computer Engineering, University of ILL, 4 pages (1998).

A. Criminisi, A. Zisserman, L. Van Gool, Bramble S., and D. Compton, "A New Approach to Obtain Height Measurements from Video", *Proc. of SPIE*, Boston, Massachussets, USA, vol. 3576, pp. 227-238 (Nov. 1-6, 1998).

A Revolution in Traceability, Foodproductiondaily.com, 1 page, (Mar. 10, 2004).

Eye in the Sky (camera), Wikipedia, 1 page (Dec. 11, 2009).

Edge Detection, Wikipedia, 8 pages (Feb. 10, 2010).

Corner Detection, Wikipedia, 12 pages (Feb. 9, 2010).

Evolution Robotics, 3 pages (2001-2005).

(56) References Cited

OTHER PUBLICATIONS

Athanasia et al, "P1714 Compliance of healthcare workers with hand hygiene rules in the emergency room of two tertiary hospitals in the area of Athens", International Journal of Antimicrobial Agents, Elsevier Science, Amsterdam, NL, vol. 29, Mar. 1, 2007, p. S486, SP022038903, ISSN: 0924-8579, DOI:DOI:10.1016/S0924-8579(07)71553-4.

Chapter 17: "Beyond one Still Image: Face Recognition from Multiple Still Images or a Video Sequence"; In: Shao, Wenyi (Ed.); Chellappa, Rama (Ed.): "Face Processing—Advanced Modeling and Methods", Academic Press/Elsevier, US, UK 313230, XP002639937, ISBN: 978-0-12-088452-0, pp. 547-575.

Grange, Sebastian, Baur, charles: Robust Real-time 3D Detection of Obstructed Head and Hands in Indoors Environments:, J. Multimedia, vol. 1, No. 4, Jul. 2006, pp. 29-36, XP002639938, US.

United States Department of Agriculture: "Machine Vision sees food contamination we can't see", Agricultural Research Magazine, vol. 50, No. 8 Aug. 2002, XP8137410, US, retrieved from the internet: URL:http://www.ars.usda.gov/is/AR/archive/aug02/food0802.pdf {retrieved on May 31, 2011].

Bhatt J et al: "Automatic recognition of a baby gesture", Proceedings 15th IEEE International Conference on Tools with Artificial Intelligence. ICTAI 2003. Sacramento, CA, Nov. 3-5, 2003; Los Alamitos, CA, IEEE Comp. Soc, US, vol. CONF. 15, Nov. 3, 2003, pp. 610-615, XP010672284, DOI: DOI:10.1109/TAI.2003.1250248 ISBN: 978-0/7695-2038-4.

Lohr, S., "Couputers That See You and Keep Watch Over You," The New York Times, 5 pp, Jan. 1, 2011.

"GE Healthcare's Smart Patient Room to Begin Data Collection," 3 pages, Sep. 15, 2010.

\* cited by examiner

AUTOMATED MONITORING AND CONTROL OF SAFETY IN A PRODUCTION AREA

This application claims the benefit of, and incorporates by reference the entirety of, Provisional Application No. 61/134,654 filed on Apr. 1, 2010

FIELD OF THE INVENTION

The invention is directed to automated monitoring and control of safety in a production area.

BACKGROUND OF THE INVENTION

In 2007, worker compensation claims tallied a total of over 80 billion dollars in the United States. Accidents associated with back injuries accounted for one in every five claims and liability associated with damaged eyes totaled over $100 million dollars. There were four million non-fatal workplace injuries in 2007 and over 5000 workplace deaths. Many of these accidents can be attributable to safety violations and non-safe work practices.

Although there are numerous vendors supplying the market with personal protective equipment (hereinafter, "PPE") such as safety glasses and safety shoes, and although employers require employees to conduct periodic safety meetings, the cost of injury to persons and property in the workplace remains high. Manual monitoring of employees, vendors, and visitors through close circuit camera or direct supervision is both expensive and subjective. The overall reporting of violations can be inaccurate and unverifiable.

There is a need for a system that accurately monitors individuals as they use machinery, tools, and vehicles, to assure that proper safety protocol is followed to avoid injury to themselves and others in the vicinity, as well as avoiding damage to products and production equipment.

SUMMARY OF THE INVENTION

A first aspect is directed to an automated process for monitoring and controlling safe working practice in a production area, comprising: capturing image data from the production area over a time period; processing the image data; and activating a safety control device if a threshold image value is satisfied for a threshold time period. The image data is processed by finding an image of a face of an individual in motion in the production area, and determining whether the image of the face has associated therewith a required article of personal protective equipment, and whether the required article of personal protective equipment is properly positioned on the individual. The processing of the image data is carried out utilizing a stabilization algorithm to determine whether the image data satisfies a threshold image value for a threshold time period, with the threshold image value being a pre-determined minimum image value correlating an absence of the personal protective equipment properly positioned on the individual, and the threshold time period being a pre-determined minimum time period that the threshold image value is satisfied.

In an embodiment, the personal protective equipment comprises at least one member selected from the group consisting of glasses, goggles, ear plugs, ear muffs, face mask, respirator, hair net, hard hat, wrist band, glove, skirt, gown, apron, shoes, and boots.

In an embodiment, the image data is captured by scanning at least a portion of the production area with a camera.

In an embodiment, the activation of the safety control device comprises activating at least one member selected from group consisting of a means for injury prevention, an alarm to notify the individual that the at least one article of personal protective equipment is not present or is not properly positioned, and/or the generation of a report that the article of personal protective equipment was not present while the individual was present in the production area, or was not properly positioned while the individual was present in the production area.

In an embodiment, the safety control device is a means for injury prevention comprising at least one member selected from the group consisting of cutting off power to at least one machine in the production area, and interjecting a physical restraint or barrier between the individual and the machine in the production area.

In an embodiment, the activation of the safety control device comprises setting off the alarm, and the alarm comprises at least one member selected from the group consisting of an audible alarm, a visual alarm, and a vibratory alarm.

In an embodiment, the report includes an image of the individual in the production area while the threshold image value is satisfied for the threshold time period, and a notation of a time at which the image was captured.

In an embodiment, the process further comprises the transmission of the report, which can include transmission of an electronic report and/or transmission of a hard copy report.

In an embodiment, at least one member selected from the work zone, the individual, and the article of personal protective equipment has an RFID tag thereon.

A second aspect is directed to an automated process for monitoring and controlling safe working practice in a production area, comprising capturing image data of the production area over a time period, processing the image data to obtain position as a function of time of at least one member selected from the group consisting of an individual, a tool, a vehicle, an article-in-progress and a machine, and activating a safety control device if the movement is outside of a safe movement range. The processing of the image data utilizes a stabilization algorithm to determine whether the movement is outside of the safe movement range. The stabilization algorithm processes the image data related to the movement of the individual, tool, vehicle, etc., to determine whether the movement is outside of the predetermined safe movement range for a time period outside of a predetermined threshold minimum time period.

In an embodiment, the image data is processed to determine whether the individual, tool, vehicle, etc has moved into a position outside of the safe movement range.

In an embodiment, the image data is processed to determine whether the individual, tool, vehicle, etc. is moving at a speed outside of the safe movement range.

In an embodiment, the image data is processed to determine whether the individual, tool, vehicle, etc. is moving with acceleration outside of the safe movement range.

In an embodiment, the image data is captured by scanning at least a portion of the production area with a camera.

In an embodiment, the vehicle is a fork lift.

In an embodiment, the safety control device comprises at least one member selected from group consisting of: a power deactivation device for turning off power to at least one member of the group consisting of the machine, tool, vehicle, or article-in-progress in the production area; means to control the movement of at least one member selected from the group consisting of the machine, tool, vehicle, or article-in-progress in the production area; an alarm to notify the individual that the movement is outside of the safe movement range for period of time exceeding the threshold time period; and a report that the movement is outside of the safe movement range for a period of time exceeding the threshold time period.

In an embodiment, the safe movement range includes a predetermined standard for avoiding injury to the individual or other individuals in the production area, and/or for avoiding damage to the tool, vehicle, article-in-progress, or machine.

In an embodiment, the safety control device comprises at least one member selected from the group consisting of an audible alarm, a visual alarm, and a vibratory alarm.

In an embodiment, the safety control device comprises a report including an image of the individual, machine, tool, or article-in-progress determined to be moving outside of the safe movement range for a time period exceeding the threshold time period, and a notation of a time at which the image was captured.

The second aspect can utilize any one or more features in any disclosed embodiment of any other aspect disclosed herein.

A third aspect is directed to an automated process for monitoring and controlling safe working practice in a production area, comprising capturing image data of the production area over a time period, processing the image data to determine conformation, over the time period, of at least one member selected from the group consisting of an individual, a tool, a vehicle, an article-in-progress, and a machine, and activating a safety control device if the threshold conformation value is satisfied for the threshold time period. The processing of the image data utilizes a stabilization algorithm to determine whether the image data satisfy a threshold conformation value for a threshold time period, with the threshold conformation value being a pre-determined minimum conformation value correlating to an unsafe conformation of the individual, tool, vehicle, article-in-progress, or machine, and the threshold time period being a pre-determined minimum time period that the threshold image value is satisfied.

In an embodiment, the image data is captured by scanning at least a portion of the production area with a camera.

In an embodiment, the vehicle is a fork lift, and the threshold conformation value comprises a height of lift value.

In an embodiment, the threshold conformation value comprises a combination of the height of lift value and a load size value.

In an embodiment, the activation of the safety control device comprises at least one member selected from group consisting of: (i) activating a power deactivation device for turning off power to at least one member of the group consisting of the machine, tool, vehicle, or article-in-progress in the production area; (ii) activating a means to limit further conformational movement past the threshold conformation value; (iii) an alarm to notify one or more individuals in the production area that the threshold conformation value has been exceeded for the threshold time period; and (iv) a report that the threshold conformation value has been met for the threshold time period.

In an embodiment, the alarm comprises at least one member selected from the group consisting of an audible alarm, a visual alarm, and a vibratory alarm.

In an embodiment, the report comprises an image of the individual, machine, tool, or article-in-progress determined to meet the threshold conformation value for the threshold conformation period, and a notation of a time at which the image was captured.

In an embodiment, the process further comprises transmitting the report to a recipient, with the report comprising at least one member selected from the group consisting of an electronic report and a hard copy report.

In an embodiment, at least one member selected from the individual, machine, tool, or article-in-progress has an RFID tag thereon.

In an embodiment, the process further comprises capturing image data of an individual lifting an object, with images of the conformation of the individual during lifting being processed to determine whether the conformation of the individual during lifting satisfies the threshold conformation value for the threshold time period.

The third aspect can utilize any one or more features in any disclosed embodiment of any other aspect disclosed herein.

A fourth aspect is directed to an automated system for monitoring and controlling safe working practice in a production area, the system comprising: a computer; an imaging sensor in communication with the computer, the imaging sensor being configured and arranged to capture image data of at least a portion of the production area; and a computer-readable program code disposed on the computer. The computer-readable program code comprises: (i) a first executable portion for processing image data and creating an image of the production area, (ii) a second executable portion for processing image data to find an image of a face of an individual in motion in the production area, (iii) a third executable portion for processing image data and determining whether an article of personal protective equipment is present in association with the image of the face of the individual, (iv) a fourth executable portion for processing image data and determining if the article of personal protective equipment is properly positioned on the individual while the individual is in the production area, (v) a fifth executable portion comprising a stabilization algorithm to determine whether the image data satisfies a threshold image value for a threshold time period, with the threshold image value being a pre-determined minimum image value correlating an absence of the personal protective equipment properly positioned on the individual, and the threshold time period being a pre-determined minimum time period that the threshold image value is satisfied; and (v) a sixth executable portion for activating a safety control device if the article of personal protective equipment is not present and properly positioned on the individual while the individual is present in the production area.

In an embodiment, the imaging sensor is a first imaging sensor and the system further comprises a second imaging sensor in communication with the computer, with the computer-readable program code disposed on the computer being provided with executable first, second, third, and fourth executable portions for creating and processing image data of at least a portion of the production area from the second imaging sensor, with the creating and processing of the image data from the second imaging sensor being carried out in a manner corresponding with the executable portions for capturing and processing image data from the first imaging sensor.

In an embodiment, the imaging sensor is a scanning imaging sensor configured and arranged to scan a production area.

In an embodiment, the system further comprises a data entry device that is in communication with the computer.

In an embodiment, the system further comprises a printer that is in communication with the computer and is capable of printing a report of a determination of whether personal protective equipment is properly positioned on an individual in a production area.

The fourth aspect can utilize any one or more features in any disclosed embodiment of any other aspect disclosed herein.

A fifth aspect is directed to an automated system for monitoring and controlling safe working practice in a production area, the system comprising: a computer, an imaging sensor in communication with the computer, a safety control device, and a computer-readable program code disposed on the computer. The imaging sensor is configured and arranged to capture image data from the production area over a time period. The computer-readable program code comprises: a first executable portion for processing image data and creating an image of the production area; a second executable portion for processing image data during the time period to find, and determine movement of, at least a portion of at least one member selected from the group consisting of an individual, a tool, a vehicle, an article-in-progress, and a machine; and a third executable portion for activating the safety control device if the movement is outside of the safe movement range for a time period exceeding a threshold time period. The second executable portion further comprises a stabilization algorithm to process the image data to determine whether the movement is outside of a safe movement range for a time period in excess of a threshold time period. The safe movement range is a pre-determined movement range in compliance with a predetermined safe movement standard. The threshold time period is a pre-determined minimum time period that the safe movement range is exceeded.

In an embodiment, the image data includes an image of the individual driving the vehicle in the production area.

In an embodiment, the image data includes an image of the individual using the tool, with the movement including movement of both the individual and movement of the tool.

In an embodiment, the image data includes an image of the individual using the machine, with the movement including movement of the individual and at least a portion of the machine.

In an embodiment, the imaging sensor is a scanning imaging sensor configured and arranged to scan a production area to capture image data over a period of time.

The fifth aspect can utilize any one or more features in any disclosed embodiment of any other aspect disclosed herein.

A sixth aspect is an automated system for monitoring and controlling safe working practice in a production area, comprising a computer, an imaging sensor in communication with the computer, the imaging sensor being configured and arranged to capture image data from the production area over a time period, a safety control device, and computer-readable program code disposed on the computer. The computer-readable program code comprises: (i) a first executable portion for processing image data to determine movement of at least one member selected from the group consisting of an individual in the production area, a tool in the production area, a vehicle in the production area, an article-in-progress in the production area, and a machine in the production area, the movement being determined from image data providing position as a function of time; (ii) a second executable portion for processing the image data to determine whether the movement is outside a predetermined safe movement range for a time period in excess of a threshold time period; and (iii) a third executable portion for activating the safety control device if the movement is outside of the safe movement range for a time exceeding the threshold time period.

DETAILED DESCRIPTION

Figure 1:
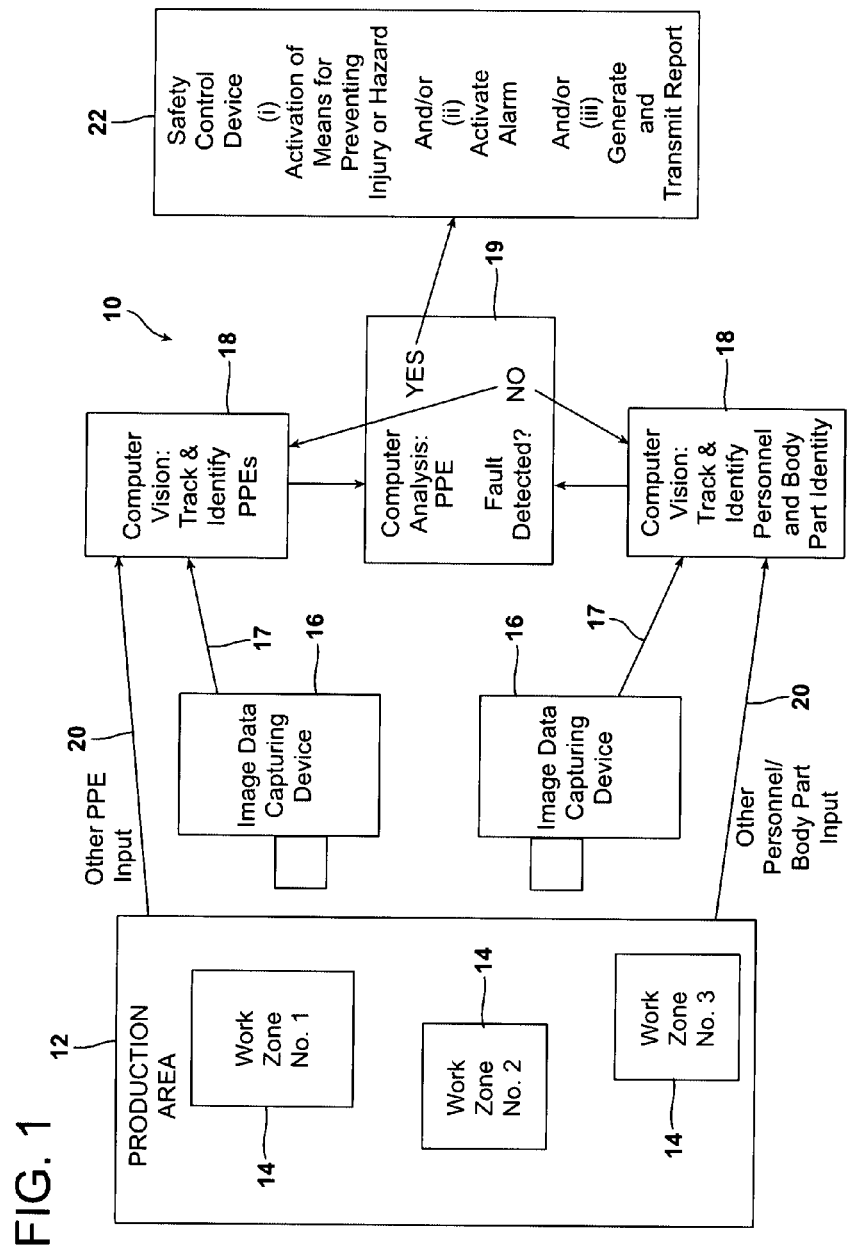
FIG. 1 is a schematic diagram illustrating an automated machine vision process and system for monitoring and controlling safe working practice through the monitoring and control of the wearing of one or more articles of PPE in a production area.

As used herein, the phrase "automated process" is used with reference to processes utilizing computer vision and/or machine vision in obtaining and processing image data. The image data is captured using one or more imaging sensors in communication with a computer. In addition to image data, data can be input from machine-readable or human-readable sensors and identifiers, radio frequency identification transponder (RFID) or other transmitting sensors, time stamps or biometric identification, object recognition, texture definition, database management and other software, data interface equipment consisting of serial, parallel, or network communication, binary data such as switches, gates, push buttons, current sensors, as well as additional forms of data input. The computer processes the image data and optionally other data from other sensors, identifiers, etc., using algorithms designed to determine whether the computer is to activate a control device, particularly a safety control device.

As used herein, the phrase "imaging sensor" refers to a component of a vision system that captures image data, e.g., a camera or other image capturing device. In computer vision and machine vision systems, one or more imaging sensors are configured and arranged to capture image data of a one or more objects within the production area. Imaging sensors include analog video cameras, digital video cameras, color and monochrome cameras, closed-circuit television (CCTV) cameras, charge-coupled device (CCD) sensors, complementary metal oxide semiconductor (CMOS) sensors, analog and digital cameras, PC cameras, pan-tilt-zoom cameras (PTZ), web cameras, infra-red imaging devices, and any other devices that can capture image data. The selection of the particular camera type for a particular facility may be based on factors including environmental lighting conditions, the frame rate and data acquisition rate, and the ability to process data from the lens of the camera within the electronic circuitry of the camera control board, the size of the camera and associated electronics, the ease with which the camera can be mounted as well as powered, the lens attributes which are required based on the physical layout of the facility and the relative position of the camera to the objects, and the cost of the camera. Exemplary cameras that may be used in the practice of the invention are available from Sony such as Sony Handycam Camcorder model number DCR-SR80.

Image data is captured and processed to determine the presence of one or more individuals, vehicles, machines, articles-in-progress, and tools, or one or more articles of PPE. Image data can be processed in a manner to determine: whether an article of PPE is being properly worn by an individual; whether an individual, vehicle, machine, articles-in-progress, or tool is exceeding a maximum safe speed or velocity; whether an unsafe or damaging conformational movement is being made by an individual, a vehicle, a machine, an article-in-progress, or a tool. The image data is then further processed to determine whether one or more predetermined standards for safe working practice are being violated. If so found, the computer is programmed to send a signal that automatically activates a safety control device.

Since motion takes place over a period of time, image data must be captured over a period of time, with differences a function of time being processed in a manner to distinguish moving objects from non-moving background, and further processed for a determination of speed and/or velocity, conformational movement, etc. The image data is processed using one or more threshold values to determine whether one or more predetermined standards for safe working practice is being violated, with activation of a safety control device in the event that the predetermined standard is being violated.

The computer system, i.e., one or more computers, can be programmed to process the image data to identify individuals, vehicles, machines, articles-in-progress, and tools, and separate them from non-moving background images. The computer can be programmed to process the image data to distinguish images of individuals from images of other moving objects. The computer system can process the image data for individuals required to be wearing PPE, and determine whether an individual is properly wearing a required article of PPE. The computer can be programmed to process the image data for moving objects by determining the speed and/or velocity and/or acceleration of the moving objects, and, for example, compare the speed and/or velocity and/or acceleration against a safe movement range of speed, velocity, or acceleration in the production area. The same kind of analysis can be used for position data, i.e., location in the production area: not every location may be within a safe movement range for an individual, vehicle, article-in-progress, etc. The computer can also be programmed to process the image data for moving objects by determining the conformational movements of the object, and compare the conformational movement to a threshold conformation value correlating with an unsafe work practice.

Computer-readable program codes include program modules, algorithms, rules, and combinations thereof. The computer system may also include computer-readable program codes that process the image data of objects being monitored to perform one or more of the following functions: identifying an object being monitored, tracking an object as it moves within the production area, locating an object in the production area, and associating information with an object. The computer may process image data utilizing program modules, algorithms, rules, and combinations thereof.

Computer vision may utilize one or more of the following: camera, computer, object recognition and tracking using blob analysis, texture definition, data base management and other software, data interface equipment consisting of serial, parallel, or network communication, specific activity based, founding data originating from the person or PPE (containing information on the individual or the PPE), and integration of other discrete characterization data such as RFID tags, binary data such as switches, gates, push buttons, or current sensors.

The computer vision system may utilize an algorithm model or vision-based software to correctly identify a person from the environment. This may involve the use of multiple cameras and the geometric correlation of the perspective of a plurality of cameras having overlapping views or views from different perspectives. Algorithms such as the background subtraction method, Canny imaging, Harris corner imaging, Shen-Castan edge detection, grey level segmentation, skeletonization, etc., can be used to process image data in a manner that identifies the visual features of a person, e.g., eyes, ears, nose, head, arms, hands, and other body parts. See also J. R. Parker, "Algorithms for Image Processing and Computer Vision, John Wiley & Sons, (1997), and D. A. Forsyth and J. Ponce, "Computer Vision a Modern Approach", Prentiss Hall (January 2003), both of which is hereby incorporated in their entireties, by reference thereto.

Using the same types of vision algorithms applied for tracking people, the safety equipment is further identified and associated to the person and the environment in which the PPE is required. Monitoring of both the initially-tracked individual and his immediate association with one or more articles of PPE can be done simultaneously. The coupling of data from auxiliary equipment from markers such as RFID tags, physical interface monitors, and electronic controls (such as in-line current sensing units) to the PPE and the person provides additional monitoring capability. In cases of monitoring conformational motions such as back bending, the person may be tracked and the motions of individual body parts as they move in relation to a background environment or object are tracked.

The software's recognition of actions may trigger parent-child relationships to other pieces of equipment and the analysis of a continuous stream of data from the cameras may initiate additional correlations of the individual as he moves through a monitored area. The interface summary and detection data may be printed to a report burned to an electronic chip, or compact disc or other storage device or stored in a computer database and referenced by a unique identifier including name, PPE type or location.

Image data can be processed using video content analysis (VCA) techniques. For a detailed discussion of suitable VCA techniques, see, for example, Nathanael Rota and Monique Thonnat, "Video Sequence Interpretation for Visual Surveillance," in Proc. of the 3d IEEE Int'l Workshop on Visual Surveillance, 59-67, Dublin, Ireland (Jul. 1, 2000), and Jonathan Owens and Andrew Hunter, "Application in the Self-Organizing Map to Trajectory Classification," in Proc. Of the 3d IEEE Int'l Workshop on Visual Surveillance, 77-83, Dublin, Ireland (Jul. 1, 2000), both of which are hereby incorporated by reference. Generally, the VCA techniques are employed to recognize various features in the images obtained by the image capture devices.

The computer system may use one or more Item Recognition Modules (IRM) to process image data for the recognition of a particular individual, vehicle, machine, article-in-progress, tool, and/or article of PPE. In addition, the computer system may use one or more Location Recognition Module (LRM) to determine the location of a particular individual, tool, vehicle, article-in-progress, machine, or article of PPE. In addition, the computer system may use one or more Movement Recognition Modules (MRM) to process movement data for the recognition of a particular individual, tool, vehicle, article-in-progress, machine, or article of PPE. The computer may use IRM in combination with LRM and/or MRM in identifying and tracking movements of particular individual, tool, vehicle, article-in-progress, machine, or article of PPE for the purpose of assessing velocity of movement and/or conformational movement characteristics, as well as in assessing whether PPE requirements are being violated. The IRM, LRM, and MRM can be configured to operate independently or in conjunction with one another.

The image data can be analyzed using human classification techniques that can be employed for the purpose of confirming whether an object is a human, as well as for analyzing the facial features. Face detection may be performed in accordance with the teachings described in, for example, any one or more of the following, each of which is incorporated, in its entirety, by reference thereto: International Patent WO 9932959, entitled "Method and System for Gesture Based Option Selection", and Damian Lyons and Daniel Pelletier, "A line-Scan Computer vision Algorithm for Identifying Human Body Features," Gesture '99, 85-96 France (1999); M. H. Yang and N. Ahuja, "Detecting Human Faces in Color Images", *Proc. Intl Conf IEEE Image Processing*, pp. 127-139, October 1998; I. Haritaoglu, D. Harwood, L. Davis, "Hydra: Multiple People Detection and Tracking Using Silhouettes," Computer Vision and Pattern Recognition, Second Workshop of Video Surveillance (CVPR, 1999); A. Colmenarez and T. S. Huang, "Maximum Likelihood Face Detection", *International Conference On Face and Gesture Recognition*, pp 164-169, Kilington, Vt. (Oct. 14-16, 1996); Owens, J. and Hunter, A., "Application of the Self-Organising Map to Trajectory Classification", *Proc. 3rd IEEE International Workshop on Visual Surveillance, IEEE Comput. Soc*, Los Alamitos, Calif., USA, pages 77-83 (2000); N. Rota and M. Thonnat, "Video Sequence Interpretation For Video Surveillance, *Proceedings of the Third IEEE International Workshop on Visual Surveillance* (2000); Srinivas Gutta, Jeffrey Huang, Ibrahim F. Imam, Harry Wechsler, "Face and Hand Gesture Recognition Using Hybrid Classifiers", *Proceedings of the International Conference on Automatic Face and Gesture Recognition, ICAFGR* 96, 164-169, Killington (1996); and A. Criminisi, A. Zisserman, L. Van Gool, Bramble S., and D. Compton, "A New Approach To Obtain Height Measurements from Video", *Proc. of SPIE*, Boston, Massachussets, USA, volume 3576, pp. 227-238 (1-6 Nov. 1998).

In an embodiment, a secondary image data capturing/processing system can be used to obtain and process data from a selected area of the field of view monitored by a primary image data capturing/processing system. The primary image data capturing/processing system, which is utilized to identify personnel, PPE, and activate one or more safety control devices, can also be used to direct the secondary image data capturing/processing system. The secondary image data capturing/processing system can include hyperspectral imaging systems, thermal imaging systems, radio frequency detection devices, microwave detection devices, colorimetric detection devices, gas chromatography, as well as electromechanical focusing equipment.

The data processing of the primary image data capturing/processing system can be designed to activate the secondary image data capturing/processing system upon the detection of a condition that the secondary image data capturing/processing system has the capability to further assess in a desired manner. The data processing of the primary image data capturing/processing system can be designed to activate the secondary image data capturing/processing system upon the detection of a condition that the secondary image data capturing/processing system has the capability to further assess in a desired manner.

For example, a primary image data capturing/processing system can be used to monitor a work area in a factory, find an individual working at a machine, and then subsequently define the arms and hands of a person at work. The primary image data capturing/processing system can activate a secondary image data capturing/processing system which determines whether a solvent emitted from the machine is present on the hands of the individual have, i.e., the solvent emitted from the machine is a hazardous substance placing the individual at a health risk. The secondary image data capturing/processing system could utilize a hyperspectral imaging camera (e.g., a HySpex™ hyperspectral camera such as HySpex™ model VNIR-640s hyperspectral camera available from Norsk Elektro Optikk AS), to observe just the defined hand area and determine if the hands are contaminated with solvent; further enabling the activation of an alarm system if the solvent is found. This parallel process with selective focusing multiple cameras increases the speed and efficiency with which data can be analyzed.

As used herein, the phrase "production area" refers to any area in which an automated system is used in a process of monitoring and controlling safety as individuals and/or machines work in an environment to make any form of measurable progress. While a typical production area would be a factory in which articles of manufacture are being produced, the phrase "production area" includes restaurants, gas stations, construction sites, offices, hospitals, etc., i.e., anywhere a product is being produced and/or a service is being rendered. The criteria for controlling safety in any particular production area depends upon the particular nature of the production area, i.e., what articles are being produced and/or services offered, and the safety control requirements associated with those products and/or services.

As used herein, the phrase "work zone" refers to a discrete area that can correspond with an entire production area, one or more discrete regions of a production area, or even an entire production area plus an additional area. Different regions within a production area can have different safe working practice requirements. For example, a first work zone could include only a defined area immediately surrounding a particular machine in a factory. The PPE requirements for the machine operator and others within a specified distance of the machine may be greater than the PPE requirements just a few meters away from the machine. A factory can have many different work zones within a single production area, such as 2-100 work zones, 2-50 work zones, or 2-10 work zones. Alternatively, a factory can have uniform PPE requirements throughout the production area, i.e., only one work zone.

As used herein, the phrase "personal protective equipment" (i.e., hereinafter referred to as an article of "PPE") refers to any article to be worn by an individual for the purpose of preventing or decreasing personal injury or health hazard to the individual in or around the production area, or exposure to potentially harmful substances. As such, articles of PPE include safety glasses, safety goggles, face shields, face masks, respirators, ear plugs, ear muffs, gloves, suits, gowns, aprons, hard hats, hair nets to keep hair from fouling in machinery, etc.

As used herein, the phrase "safety control device" includes any device that, when activated, is designed to prevent, reduce the likelihood of, or reduce the degree of, an injury to one or more individuals, or damage to one or more vehicles, articles of manufacture, machines, or tools. The safety control device can be designed to immediately prevent injury or damage, and/or reduce the likelihood of injury or damage, and/or reduce the degree of injury or damage. For example, the activation of the safety control device discontinues power to a machine, or interjects a physical barrier or restraint between an individual and a source of potential injury. Alternatively, the safety control device may provide a more delayed effect on prevention or reduction of injury or damage. For example, the safety control device may be in the form of an alarm to alert one or more individuals to the heightened risk associated with an unsafe condition. The alarm notifies one or more individuals of the unsafe condition, with the individual or individuals being left to decide how to address the condition in response to the alarm. Alternatively, the safety control device can generate and transmit a report to a production manager, agent, safety officer, etc for the purpose of modifying behavior so that the unsafe condition is less likely to occur in the future.

As used herein, the term "movement" includes movements of objects in which the location of the center of gravity of the individual or object changes, as well as movements in which the center of gravity does not change, but the conformation of the individual or object changes. Changes in the location of the center of gravity of an individual or object in an ascertainable time period correlate with the velocity of the individual or object. "Conformational movements" are movements in which there is a substantial change in the location of the individual or object, but only a small (or no) change in the location of the center of gravity of the individual or object. Bending, twisting, and lifting actions by individuals and machines are considered to be largely conformation movements, as the change in the location of the center of gravity of the individual or machine is generally small relative to an object traveling at a substantial velocity.

The automated process for monitoring and controlling safe working practice utilizes algorithm-based computer vision to: (i) identify and track an individual; (ii) identify and track safety devices (including PPE), safety areas, machines, and/or other physical objects; (iii) identify areas of the person's body and establish a relationship to the tracked safety devices (including PPE), safety areas, machines, external identifiers, or other physical objects; (iv) assess the association of the person's body to the safety devices (including PPE) or safety boundary, and make a determination of fault; and (v) determine and report the information obtained in a manner allowing for ease of review. Computer vision can be used to associate an individual with his PPE, such as goggles, glasses, ear muffs, masks, gloves, respirators, gowns, hard hats, and hair nets and/or monitor the individual's driving performance in a vehicle (e.g., a forklift), monitoring an individual's conformational motion (e.g., bending with lifting and/or bending without lifting), or physical proximity of an individual to a safety boundary such as a machine, vehicle, article-of-manufacture, tool, yellow warning tape, etc.

Computer vision may utilize one or more of the following: camera, computer, object recognition and tracking using blob analysis, texture definition, data base management and other software, data interface equipment consisting of serial, parallel, or network communication, specific activity based, founding data originating from the person or safety equipment (containing information on the individual or safety equipment), and integration of other discrete characterization data such as RFID tags, binary data such as switches, gates, push buttons, or current sensors.

One or more embodiments of the present invention now will be described with reference to the accompanying drawings, in which some, but not all embodiments of the invention are shown. The invention may be embodied in many different forms and should not be construed as limited to the embodiments set forth herein. Rather, these embodiments are provided so that this disclosure will satisfy applicable legal requirements. Like numbers refer to like elements throughout.

FIG. 1 is a schematic diagram illustrating an automated machine vision process and system 10 for monitoring and controlling safe working practice through the monitoring and control of the wearing of one or more articles of PPE in a production area. Computer vision system 18 for monitoring and controlling safe working practice in production area 12 by captures and processes data related to one or more individuals wearing PPE. Production area 12 has multiple work zones 14 therein. Although image data capturing devices 16 (e.g., cameras) are shown outside of production area 12, they could be within production area 12. The one or more image data capturing devices 16 could be within production area 12 but not within any of work zones 14, or some or all image data capturing devices 16 could be within one or more of work zones 14. Image data capturing devices 16 provide image data input to one or more computer vision system 18 with data tracking and identifying personnel and body parts of personnel including their location in production area 12, including whether an individual is within one of work zones 14. In addition to data provided by image data capturing devices 16, other PPE-related data can be provided to computer vision system(s) 18 via other data input means such as symbolic alpha, or numeric information embodied in or on a machine or machine-readable or human-readable identifier such as a tag or label (e.g., bar coded tag or label), a hole pattern, a radio frequency identification transponder (RFID) or other transmitting sensors, machine readable sensors, time stamps or biometric identification, safety equipment markers or designs or coloration, etc., as is illustrated other incoming data 20 from production area 12.

The resulting automated process system 10 provides data that is compared to predetermined fault criteria programmed into the one or more fault-detection analysis computer 19. The fault criteria are met if an individual is present in the production area 12 and/or one or more of work zones 14 without wearing the one or more articles of PPE required for the respective production area 12 or zone 14, or without having the one or more required articles of PPE properly positioned while the individual is in the respective production area 12 or work zone 14. If the computer vision system 18 in combination with the fault-detection computer 19 determine that one or more individuals are not wearing the required article(s) of PPE in the respective production area 12 or work zone 14, and/or if the automated process determines that required article(s) of PPE are not properly positioned on the one or more individuals in the production area 12 or work zone 14, data input from computer vision system 18 to fault-detection computer 19 assesses the existence of a fault, causing fault-detection computer 19 to trigger safety control device 22. Safety control device 22 takes one or more actions selected from the group consisting of (i) activating an injury prevention means, (ii) activating an alarm, and (iii) activating the generation and transmission of a report of a safe work practice violation.

As used herein, the phrase "means for injury prevention" includes all means for preventing, reducing the probability of, or reducing the degree of a foreseeable injury to persons or property due to the absence or improper wearing of one or more required articles of PPE by an individual in a work zone, or the absence of meeting required safety standards for the movement and/or operation of vehicles, machines, tools, articles-in-progress, etc. Examples of means for injury prevention include cutting off power to a machine or tool or other equipment, interjecting a physical restraint or barrier between the individual and a machine or tool in the work zone.

If the automated process is directed to the presence and proper use of safety glasses (or safety goggles or any other form of safety equipment for the eyes), the machine vision system can be designed to view the scene and detect the face of an individual and perform segmentation based on proportionality to find the eyes. The machine vision system can be designed to find features associated with safety glasses (including color mismatch, etc) and can be designed to remove non-moving objects, and zoom and/or read information on associated objects or persons and activate electromechanical circuit(s).

If the automated process is directed to the presence and proper use of ear plugs (and ear muffs or another other form of safety equipment for the ears), the machine vision system can be designed to view the scene and perform background subtraction and detect the face of an individual, and perform segmentation based on proportionality to find the ears of the individual. The machine vision system can be designed to find features associated with ear plugs (including color mismatch, etc) and can be designed to remove non-moving objects and zoom and/or read information on associated objects or individuals, and activate electromechanical circuit(s).

If the automated process is directed to the presence and proper use of a face mask (or respirator or any other form of safety equipment related to atmosphere being inhaled), the machine vision system can be designed to view the scene and perform background subtraction and detect the face of an individual, and perform segmentation based on proportionality to find the mouth and nose of the individual. The machine vision system can be designed to find confirmation features associated with the face mask (including color mismatch, etc) and can be designed to remove non-moving objects and zoom and/or read information on associated objects or individuals, and activate electromechanical circuit(s).

If the automated process is directed to the presence and proper use of a hard hat (or a hair net or any other health or safety equipment related to the head), the machine vision system can be designed to view the scene and perform background subtraction and detect the face of an individual, and perform segmentation based on proportionality to find the head of the individual. The machine vision system can be designed to find confirmation features associated with the hard hat (including color mismatch, etc) and can be designed to remove non-moving objects and zoom and/or read information on associated objects or individuals, and activate electromechanical circuit(s).

If the automated process is directed to the presence and proper use of a wrist brace (or wrist band or any other form of safety equipment for the wrist or wrists), the machine vision system can be designed to view the scene and perform background subtraction and detect the body of an individual, and perform segmentation based on proportionality to find the wrist(s) of the individual. The machine vision system can be designed to find features associated with the writ brace (including color mismatch, etc) and can be designed to remove non-moving objects and zoom and/or read information on associated objects or individuals, and activate electromechanical circuit(s).

If the automated process is directed to the presence and proper use of one or more gloves (or any other form of safety equipment for one or both hands), the machine vision system can be designed to view the scene and perform background subtraction and detect the face of an individual, and perform segmentation based on proportionality to find the arms of the individual. The machine vision system can be designed to find features associated with one or more gloves (including color mismatch, etc) and can be designed to remove non-moving objects and zoom and/or read information on associated objects or individuals, and activate electromechanical circuit(s).

If the automated process is directed to the presence and proper use of gown (or a skirt or apron or any other form of safety equipment for the body of an individual), the machine vision system can be designed to view the scene and perform background subtraction and detect the body of an individual, and perform segmentation based on proportionality to find the hips, shoulders, and feet of the individual. The machine vision system can be designed to analyze proportionality ratios to confirm the presence or absence of the gown (including color mismatch, etc) and can be designed to remove non-moving objects and zoom and/or read information on associated objects or individuals, and activate electromechanical circuit(s).

Figure 2:
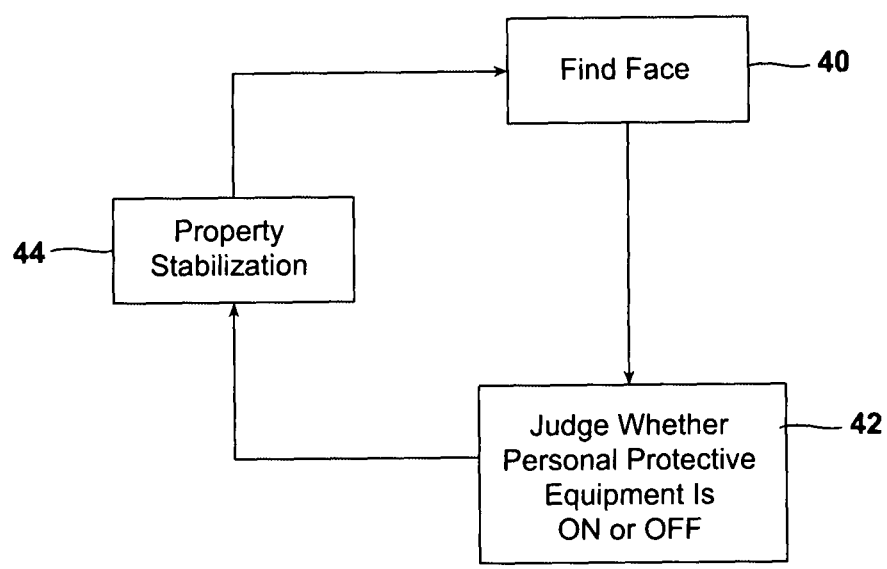
FIG. 2 is a representative schematic of loop process for determining whether one or more persons in a production area are properly wearing PPE.

FIG. 2 illustrates a representative schematic of loop process for determining whether one or more persons in a production area are properly wearing PPE. The process of FIG. 2 includes: (i) primary data processing module 40 for finding a moving face within a production area, (ii) secondary data processing module 42 for determining the presence or absence of PPE such as safety goggles on the associated face, as well as whether the PPE is properly positioned on the face, and (iii) tertiary data processing module 44 which utilizes a stabilization algorithm that tracks the face within the production area to ensure consistent data reporting.

Stabilization algorithm 44 completes a data processing feedback loop to prevent "false positives" from occurring. In the absence of stabilization algorithm 44, it is difficult to set up the image capturing device and associated primary data processing module 40 and second processing module 42 so that together they consistently maintain an accurate determination of the presence or absence of properly positioned PPE on an individual in motion in the production area. Motion of the face, motion of other objects in the production area, and various other factors have been determined to make it difficult to consistently make accurate determinations of the presence and placement of PPE on a moving face in the production area. As a result, inaccurate conclusions of non-compliance (i.e., "false positives") have been found to occur at a high rate, particularly when image data is being captured at a rate of, for example, 50 images per second. Single occurrences of images which show the presence of a face but which are inaccurately assessed by the data processing to be in the absence of PPE, can soar to thousands per hour. The stabilization algorithm of tertiary data processing module 44 requires a combination of (a) assessment of a pre-determined quality of image (i.e., a minimum image value) associated with the face in the absence of properly positioned PPE, and that this quality of image be present for at least a pre-determined minimum time period, before the system reports a PPE non-compliance event. In this manner, the process can be carried out using a stabilization algorithm that reduces the occurrence of a false positive to, for example, less than 0.1 percent of all determinations of a non-compliance determination. In addition, the images can be processed so that an image having a very high image quality correlating with non-compliance can be saved as a record of the non-compliance event. Optionally, it can have the date, hour, and location provided therewith, together with other data such as the duration of the period of non-compliance, etc.

The first step in the process of monitoring and controlling safe working practices associated with the use of PPE is to find the image of a face in motion in a production area. This can be carried out by using Haar-like feature detection. Alternatively, the number of skin pixels within a face region can be counted in assessing that a particular image is that of a face. In contrast, an image can be determined to be something other than a face if dividing the number of skin pixels by the number of pixels in the face region produces a result less than a threshold value.

Finding facial images of one or more individuals in a production area can be reasonably limited to finding images of faces in motion in the production area. This can be performed by computing the difference between the image of the face and the background image, in which:

$$Dif=\Sigma(\text{within region})|I-B|,$$

where I is object image, and B is background image. The image can be judged as non-moving if Dif is less than a pre-determined threshold. The background image can be assessed using low pass filtering over time, in which:

$$B=\tau B+(1-\tau)I,$$

where $\tau$ is a predetermined time constant, B is a low pass filtered background image, and I is an image.

Figure 3:
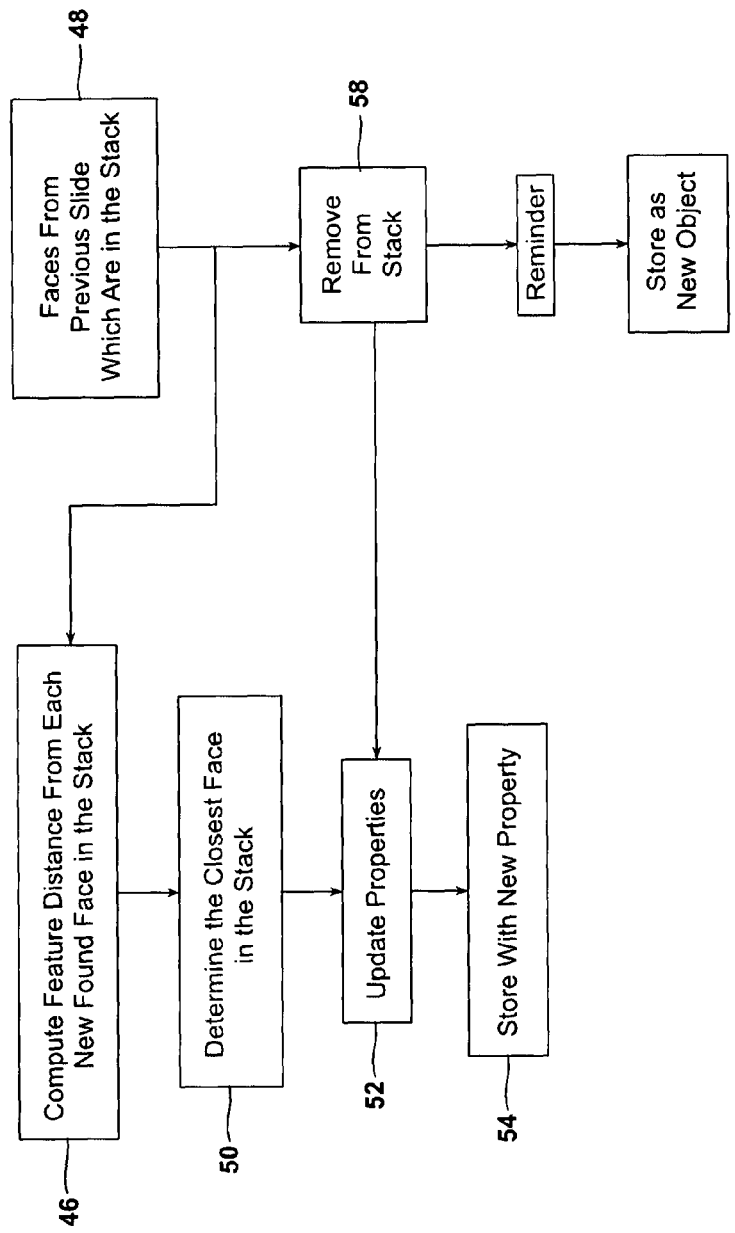
FIG. 3 is a representative schematic of a process for tracking images of faces in a production environment.

FIG. 3 illustrates a second step in the process, i.e., the step of tracking individual faces in the production area. As shown in FIG. 3 computation is made of the location of each face of the current image (46) and the locations of the features of the known faces in the previous image (48), i.e., distances are computed between each of the faces of the current image and the faces known from the image immediately preceding in time. Determinations are made as to which faces are closest to one another (50) between the faces in current image (46) and the faces in the immediately prior image (48). The speed of imaging is likely high enough (e.g., 200 milliseconds between images) that the likelihood is greatest that closest faces in the respective current and prior images in fact represent the same face. Locations and feature properties are then updated for the new image (52), and the new locations properties are stored (54). The old image of the production area including the old faces (48), can then be removed from the stack (58) (i.e., group) of closest faces in the current image (52), with faces of the new image then being stored together with the storage their new properties (54). A "reminder" is provided to ensure removal of the non-essential prior images of the faces.

The computation of feature distances can be carried out by evaluation of differences in facial position ($y_1$), differences in face size ($y_2$), and differences in color histogram differences ($y_3$). Feature distance D can be determined as:

$$D=y_1^2/\sigma_{y1}^2+y_2^2/\sigma_{y2}^2+y_3^2/\sigma_{y3}^2$$

where $\sigma_{y1}^2$, $\sigma_{y2}^2$, $\sigma_{y3}^2$ are pre-determined variances obtained from samples of the same object in continuous (i.e., successive) frames.

Properties can then be updated by characterization of the image life, i.e., by measurement of how long the image has been successfully tracked, by measurement of a low pass filtered determination of whether PPE "on/off value" of the face, and by characterization of features of the face, including position, size, and color histogram. Properties can be updated by the Increment Life value if the tracked face is associated with the face found in the current frame, as well as by Decrement Life if no face is associated to this tracked face. An example of determination of the low pass filter "on/off value" of the PPE on the face is as follows:

$$LPF\leftarrow\tau LPF+(1-\tau)status$$

here $\tau$ is a predetermined time constant.

Figure 4:
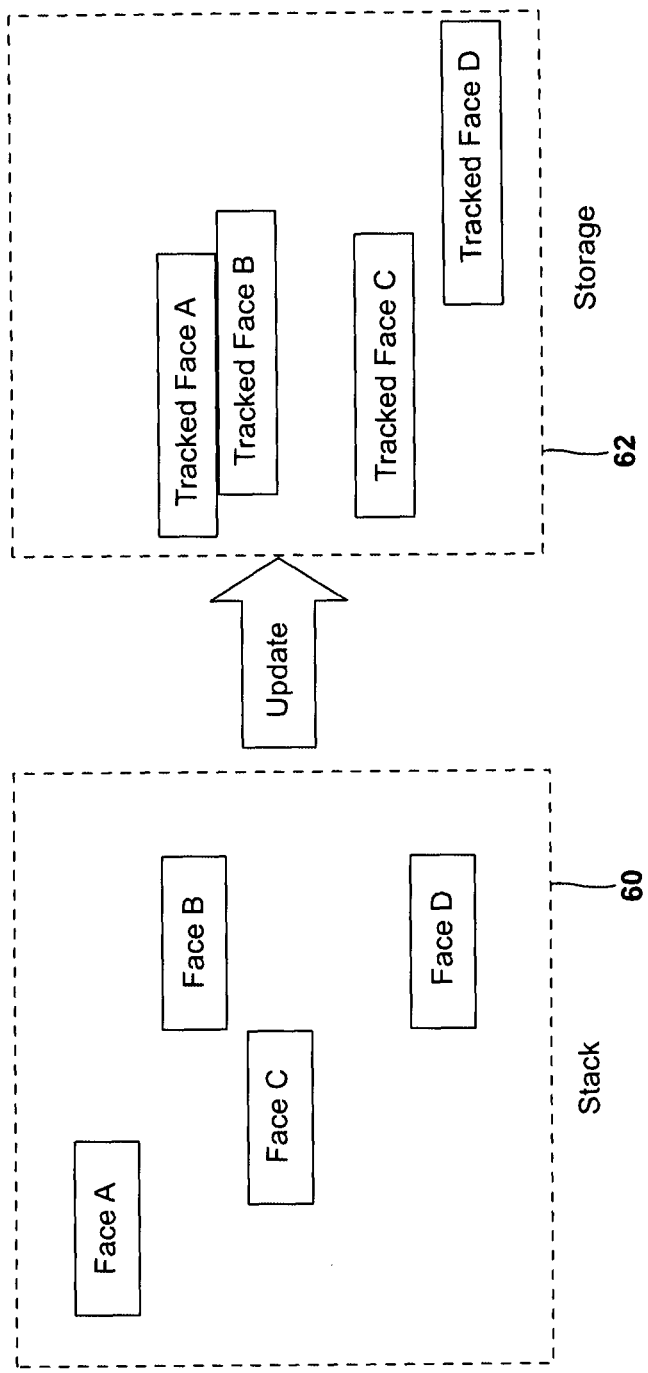
FIG. 4 is an illustration of the tracking of a plurality of faces in a given image from the production area.

FIG. 4 is an illustration of the tracking of a plurality of faces in a given image from the production area. Image 60 is taken at $T_1$. In image 60, Face A, Face B, Face C, and Face D appear at particular locations. Image 62 is taken at time $T_2$, a fraction of a second after $T_1$. Image 62 shows tracked Face A, tracked Face B, tracked Face C, and tracked Face D at particular locations of image 62. While tracked Face A and tracked Face B are in approximately the same locations at $T_2$ as at $T_1$, tracked Faces B and C appear in different positions at $T_2$, showing their relative movement between $T_1$ and $T_2$. As described above, the properties of each of Faces A-D include their "life" (i.e., how long they have been present in the image, including how long they have been present at or near their current location), the image value of the low pass filter PPE on/off value, their location (i.e., position), size, and color histogram. The update of the properties can be assessed by the increment life value, the decrement life, and the low pass filter on/off value, as described above.

Figure 5:
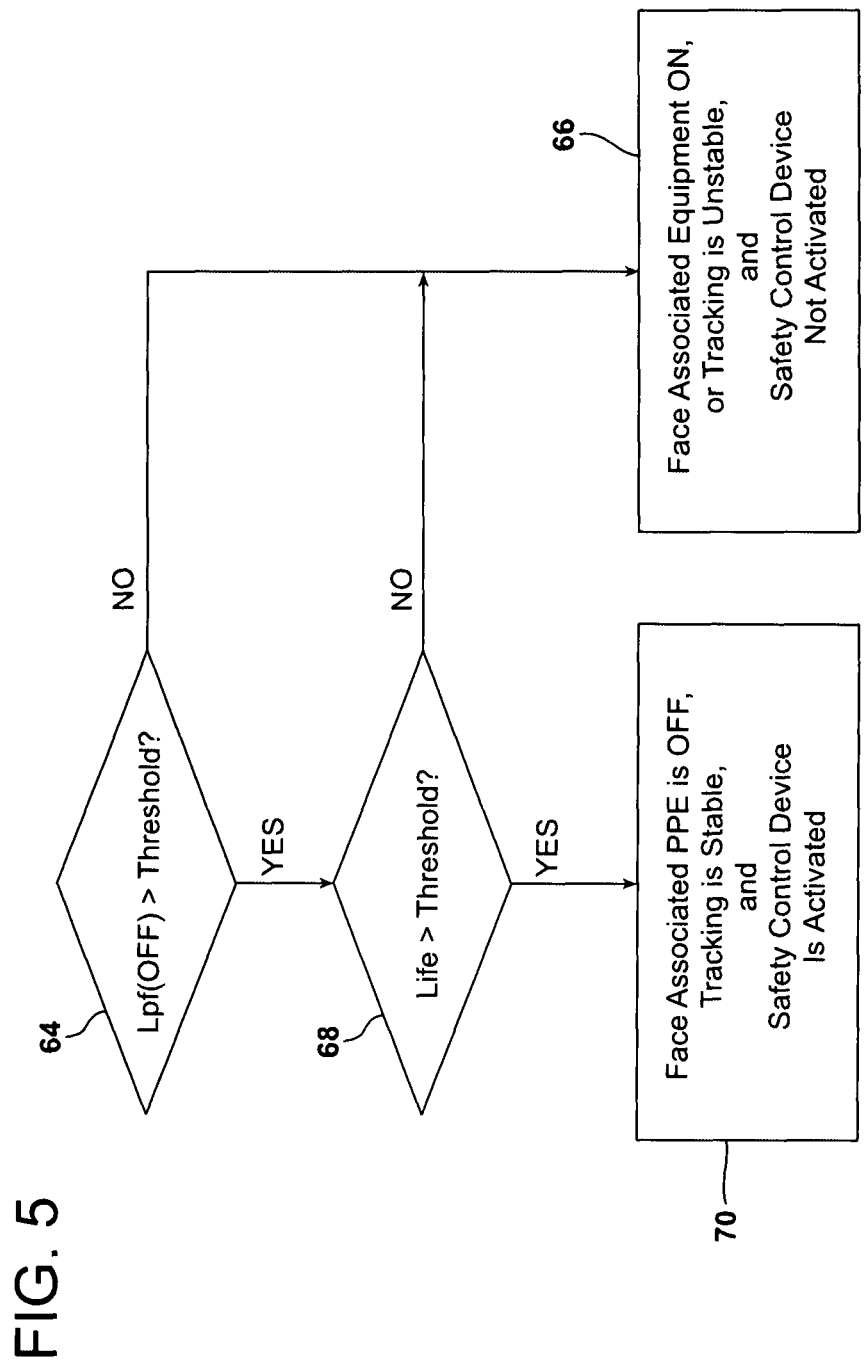
FIG. 5 is a representative schematic of the overall process for determining whether a tracked face is wearing an article of PPE.

FIG. 5 is a representative schematic of the overall process for determining whether a tracked face is wearing an article of PPE. This is the portion of the process and system that are designed to provide a data feedback loop to prevent "false positives" from occurring. In short, the feedback loop of the stabilization algorithm is set up to determine, with a high degree of accuracy, whether the individual is actually wearing a required article of PPE in a manner conforming to safety requirements within the production area. Without the use of the stabilization algorithm, a multitude of false positives have been found to occur when using image capturing and processing of faces in motion in a production area.

In FIG. 5, each tracked face is assessed using a low pass filter (64), assessing whether the image value corresponds with the face properly wearing the required article of PPE, or not properly wearing the required article of PPE. A pre-determined image value threshold is used in processing the image of the tracked face. If the image of the tracked face is such that the assessed image value is less than the threshold image value, the image is assessed as either being unstable or that the required article of PPE is being properly worn by the individual (66). In such an instance, no safety control device is activated (66).

However, if the image value threshold is met during the low pass filter processing of the image of the tracked face (64), the processing is continued by assessing whether the time period over which the image value threshold is met is a time period that meets or exceeds a pre-determined threshold time period (68). If the image value threshold has not been met for the duration of the threshold time period, the result is that time no safety control device is activated (66). However, if the threshold image value is satisfied for the threshold time period, a signal is sent that the face-associated PPE is "off" and that tracking is stable (70), with the result that a safety control device is activated (70).

Various features of the tracked face can be assessed in order to determine the image value of the face. Markers on the PPE can be provided to assess the presence or absence of properly positioned PPE on the face. The markers can have particular color and intensity patterns located at pre-determined positions, relative to the face, making it easier to determine whether the required PPE is properly worn on the face. The measure of the marker existence can be $x_1$. For example, if marker is a blue marker, $x_1$ can equal the difference between the target number of pixels and the number of blue pixels.

Similarly, high intensity points can be assessed, as the number of high intensity points represents the reflection of face-associated equipment. For example, $x_2$ can equal the number of pixels having an intensity greater than a pre-determined threshold intensity value.

A horizontal edge under the eyes can also be assessed, as the existence of an edge, and the strength of the edge located pre-determined position under the eyes and relative to the face, corresponds with the presence of properly worn PPE on the face. This can be assessed as follows:

$$x_3 = |I_1 - I_2|$$

where $I_1$, $I_2$ are pixel intensity located below eyes, with $I_1$ and $I_2$ being on the same horizontal axis but on different vertical axes.

Skin color can also be assessed as an indicator of whether PPE is properly positioned on the face, by determination of the ratio of pixels within skin color range in pre-determined range, relative to the face, e.g., where $x_4$=number of skin color pixels.

Skin color detection can be assessed as follows. First, for each pixel $p_1$=[R G B] and $p_2$=[R G B], pixel distance d is defined as $$d = (p_1 - p_2)^t \Sigma (p_1 - p_2)$$

where $\Sigma$ is a matrix, in which inverse of covariance matrix is often used. N is the of pre-determined pixel sample represents skin: $(s_1, s_2, s_3, \ldots, s_N)$. Pixel distance $(d_1, d_2, d_3, \ldots, d_N)$ is computed from each pre-determined pixel $(s_1, s_2, s_3, \ldots, s_N)$. The minimum distance within N set of distances is found using: $d_{min} = \min\{d_1, d_2, d_3, \ldots, d_N\}$. Thresholding can be carried out using a pre-determined value th. If the distance is smaller than th, the pixel is skin, otherwise, the pixel is not skin.

Another method of skin color detection, which is faster, utilizes color vector analysis wherein p=[R G B], with pre-determined vectors $a_1, a_2, a_3, \ldots$ p is skin pixel if $$(a_1^t p < th_1) \cap (a_2^t p < th_2) \cap (a_3^t p < th_3) \cap \ldots$$

In determining whether the face associated PPE is "ON" or "OFF", either of the following methods can be used. Using simple thresholding, assume features $x_1$, $x_2$, $x_3$, $x_4$ and pre-determined threshold $th_1$, $th_2$, $th_3$, $th_4$, judge face-associated PPE as "ON" if:

$$(x_1 > th_1) \cap (x_2 > th_2) \cap (x_3 > th_3) \cap (x_4 > th_4)$$

Otherwise, face-associated PPE is judged as "OFF".

The second method for determining whether the face associated PPE is "ON" or "OFF" utilizes Bayesian classifier:

$$x = [x_1 x_2 x_3 x_4]^T$$

Face-associated PPE is judged as "ON" if:

$$p_{ON}(x) > p_{OFF}(x)$$

where $p_{ON}(x)$ and $p_{OFF}(x)$ are probability functions predetermined by samples. Normal distribution is assumed.

Figure 6:
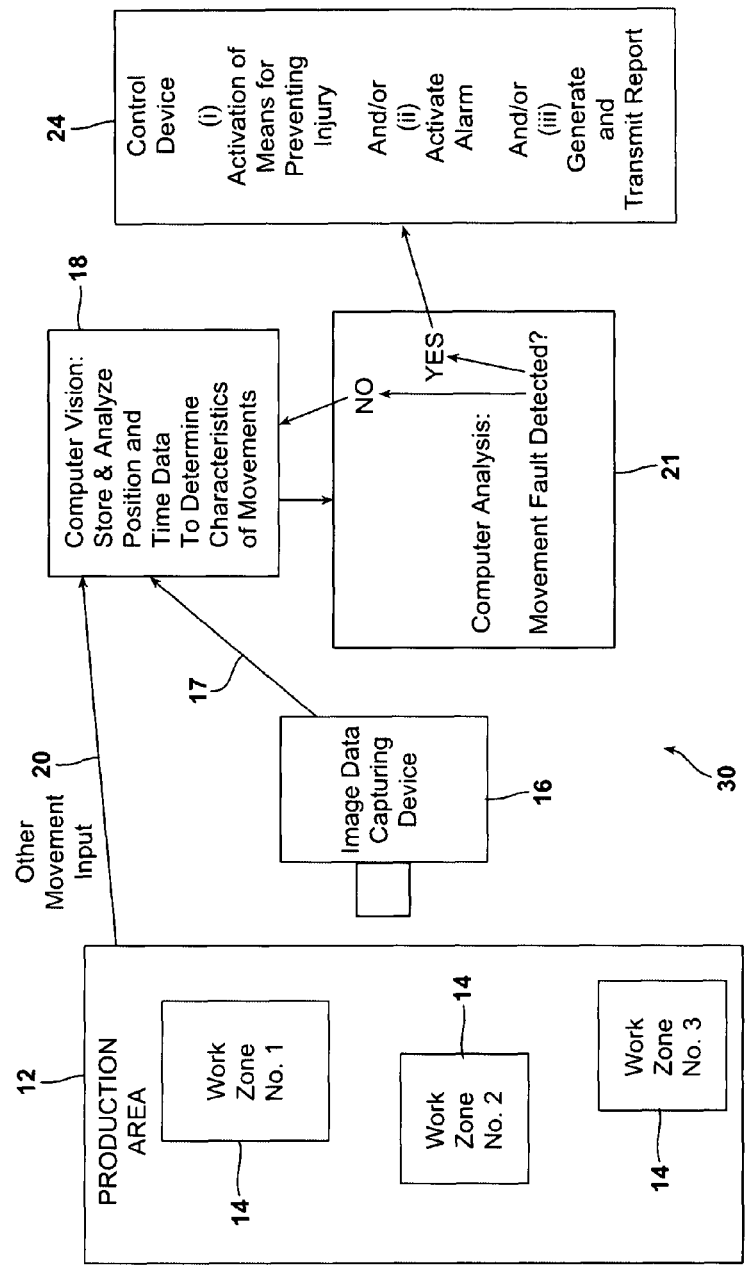
FIG. 6 is a schematic diagram illustrating an automated machine vision process and system for monitoring and controlling safe working practice through the monitoring and control of motion in a production area.

FIG. 6 illustrates an automated process & machine vision system 30 for monitoring and controlling safe working practice in production area 12, including work zones 14, by capturing and processing image data 17 of one or more individuals, one or more tools, one or more vehicles, one or more article-in-progress, and/or one or more machines, using image data capturing device 16. Image data 17 includes location data and time data for the determination of the characteristics of movement of an individual, vehicle, article-of-manufacture, machine, or tool, for a determination of the velocity thereof. The velocity of the individual, vehicle, articles-of-manufacture, machine, or tool in work zone 12 can then be compared with a predetermined maximum safe speed standard for avoiding injury or damage. In addition to data provided by image data capturing device 16, other movement-related data 20, coming from production area 12, can be provided to one or more computer 18 via other data input means such as symbolic alpha, or numeric information embodied in or on a machine or machine-readable or human-readable identifier such as a tag or label (e.g., bar coded tag or label), a hole pattern, a radio frequency identification transponder (RFID) or other transmitting sensors, machine readable sensors, time stamps or biometric identification, safety equipment markers or designs or coloration, etc. If the velocity of any one or more of the individuals, tools, vehicles, articles-in-progress, and/or machines is in conflict with the predetermined standard (i.e., predetermined, programmed fault criteria), computer vision 18 acquires the data and sends it to fault-detection computer 21, which triggers safety control device 24, for the purpose of reducing the probability or degree of injury or damage, or avoiding injury or damage entirely, or preventing injury or damage.

If the automated process is directed to the monitoring and control of safe working practice related to velocity of individuals, vehicles, articles-of-manufacture, machines, and tools in production area 12, the machine vision system can be designed to: view the scene and perform background subtraction and detect a target object, associated individual, and marker; determine the target distance from the camera; triangulate target images to determine target, vehicle, and driver speed; zoom and/or read information on associated objects or individuals, and activate electromechanical circuit(s); and determine if velocity is in conflict with a predetermined standard (i.e., fault criteria), and trigger the safety control device if the fault criteria is met.

An automated process can monitor and control the speed of anything moving in the production area, e.g., an individual, a tool, a vehicle, an article-in-progress, or a machine, or even a portion of an individual, tool, vehicle, article-in-progress, or machine. The speed being monitored and controlled can include speed associated with translational motion or rotational motion or any other motion. The speed being monitored and can be surface speed of a portion of a machined or an article in progress. In addition to monitoring and controlling speed, the process can also monitor the direction of motion, as well as the combination of speed and direction (i.e., velocity) and changes in speed and direction (i.e., changes in velocity), and acceleration. The automated process can, for example, monitor vehicle speed and/or vehicle velocity and changes thereof, such as the velocity of a fork lift in a production area. The process can activate a safety control device in the event of the detection of unsafe vehicle speed, and/or unsafe vehicle direction of movement, and/or unsafe velocity change.

Figure 7:
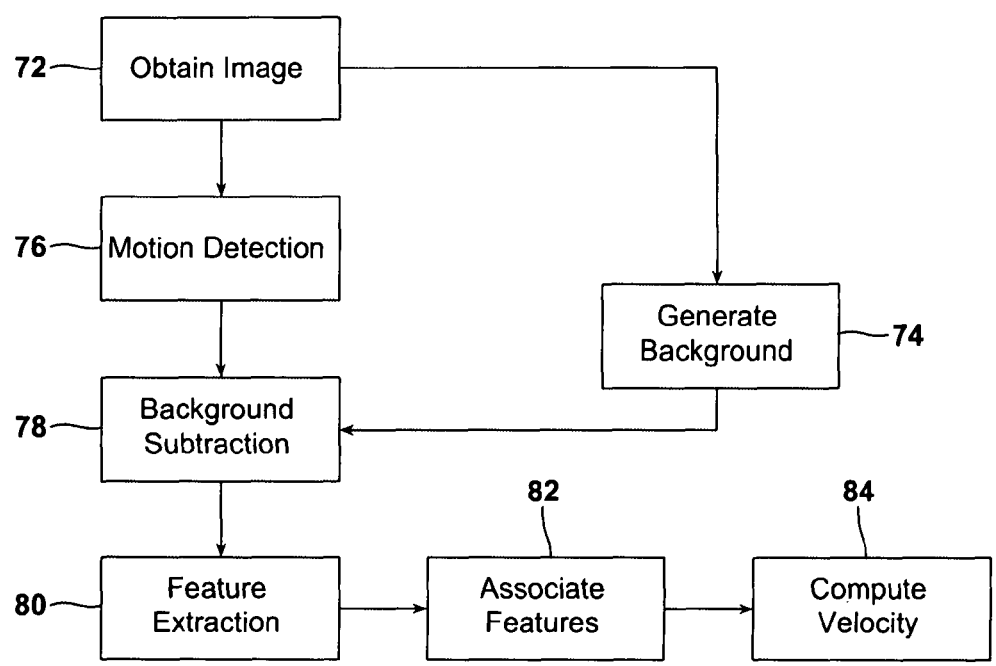
FIG. 7 is a representative schematic of the overall process for detecting and evaluating the speed of an object moving in a production area.

FIG. 7 is a representative schematic of the overall process for detecting and evaluating the speed of an object moving in a production area. The automated process for monitoring and controlling speed in the production area can utilize an algorithm consisting of several modules, including a primary algorithm (i.e., module) that finds a moving object against a fixed, non-moving background within the production area, a second algorithm that finds a specific feature of the moving object, and a third algorithm that associates features between frames to determine speed, velocity, or movement of the object or any portion thereof.

As illustrated in FIG. 7, an image of the production area is obtained (72), and background is generated (74). Motion is detected (76), and the background is subtracted to reveal the objects in motion (78). Features of objects in motion are extracted (80), and features are associated with one another in successive image frames (82), and velocity is then computed (84).

The image of the production area and the background are obtained by taking images at fixed intervals, using low pass filtering over time:

$$B(x,y) \leftarrow \tau B(x,y) + (1-\tau)I(x,y)$$

where $B(x,y)$ is background image, $I(x,y)$ is the current image, and $\tau$ is a predetermined fixed time constant.

Motion can be detected using a motion subtraction method. Motion exists if:

$$\tau_{(region\ of\ interest)}\{|I_n(x,y) - I_{n-T}(x,y)|\} > \text{threshold}$$

Most web cameras have this function. Motion detector devices can also be used.

Background subtraction can be carried out by obtaining an image of objects in the foreground, using:

$$S(x,y) = |I(x,y) - B(x,y)| > th$$

wherein $S(x,y)$ is the foreground image (i.e., a binary image), $B(x,y)$ is the background image, and th is a predetermined threshold value.

Feature extraction can be carried out using SIFT in accordance with U.S. Pat. No. 6,711,293, to D. G. Lowe, entitled "Method And Apparatus For Identifying Scale Invariant Features In An Image And Use Of Same For Locating An Object In An Image", is hereby incorporated in its entirety, by reference thereto. Only foreground region to speed up.

Figure 8:
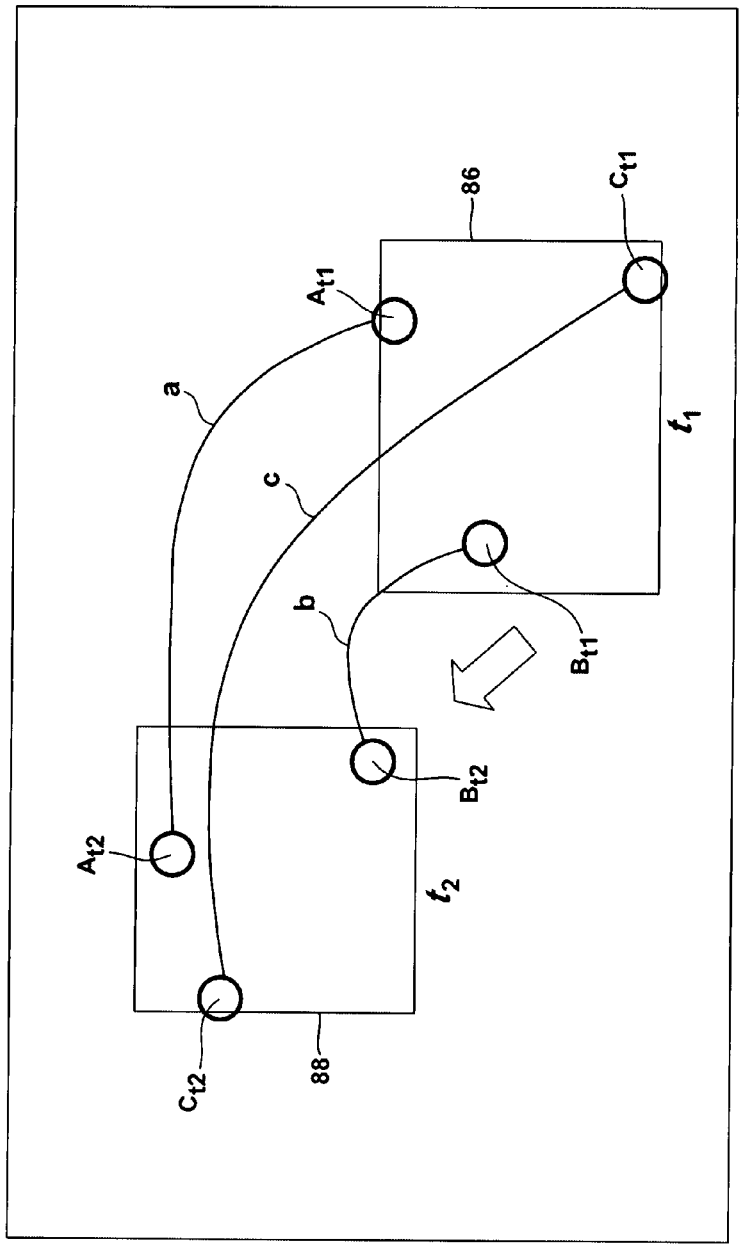
FIG. 8 is a schematic illustrating how the motion of objects is assessed by comparing the positions of the objects in successive image frames.

FIG. 8 is an illustration showing how features A, B, and C move between a first image frame taken at time $t_1$ and a second image frame taken at time $t_2$. At time $t_1$, features A, B, and C are located at positions $A_{t1}$, $B_{t1}$, and $C_{t1}$. At time $t_2$, features A, B, and C are located at positions $A_{t2}$, $B_{t2}$, and $C_{t2}$. Object velocity can be calculated as follows:

$$\text{Velocity} = (x_2 - x_1)/(t_2 - t_1)$$

where $x_1$ represents the position at time $t_1$ and $x_2$ represents the position at time $t_2$. The computed velocity can then be compared against a pre-determined maximum speed in compliance with a predetermined safe speed standard.

The computed velocity, if left unfiltered, could result in a large number of false positives due to the difficulties of image processing in a production area. As a result, the determination of speed can be filtered in the same manner as described above in FIG. 5 in the monitoring and controlling of the proper wearing of PPE in the production area. More particularly, a data feedback loop can be set up to require the speed to exceed a pre-determined maximum safe speed for a period of time meeting or exceeding a pre-determined threshold time period. This can be accomplished using a low pass filter, assessing whether the speed value does or does not exceed the maximum safe speed on a frame-by-frame basis. If the processing of the images confirms that the maximum safe speed is exceeded for a time period that meets or exceeds the pre-determined threshold time period, a signal can be sent to activate a safety control device.

In the automated process 30 of FIG. 6, image data 17 can be captured from multiple points on an individual, vehicle, article-of-manufacture, machine, or tool, to determine conformational motion thereof, using a program for assessing whether the movement of the individual, vehicle, article-of-manufacture, machine, or tool is in conflict with one or more predetermined conformation values correlating with unsafe working practices.

If the automated process is directed to the monitoring and control of safe working practice related to multiple data points from a single individual, vehicle, article-of-manufacture, machine, or tool to determine the conformation thereof and changes in the conformation as a function of time, the machine vision system can be designed to: view the scene and perform background subtraction and detect a target object such as the body of an individual, or a tool, vehicle, article-in-progress, or machine; perform segmentation based on proportionality to find portions of individual such as hips, shoulders, feet, or find portions of tool, vehicle, article-in-progress, or machine; analyze proportionality ratios to determine conformation of individual, tool, vehicle, article-in-progress, or machine as a function of time to determine conformations during movement; zoom and/or read information on associated objects or individuals, and activate electromechanical circuit(s); and determine if conformations during movement conflict with a predetermined standard (i.e., fault criteria), and trigger the safety control device if the fault criteria is met.

Conformational analysis can be used to monitor and control safe working practices related to an individual's: bending without lifting, bending with lifting, rotating, cutting, opening, closing, tightening, or transporting of a machine or tool or article-in-progress. Similarly, automated process 30 can be carried out by capturing image data 17 from multiple points on a vehicle, article-of-manufacture, machine, or tool, using a program for assessing whether the conformational movement of the respective vehicle, article-of-manufacture, machine, or tool is in conflict with one or more predetermined safe working standards for avoiding injury or damage from improper conformational movement of the respective vehicle, article-of-manufacture, machine, or tool relative to itself or another object in production area 12. For example, conformational movement of a fork lift in the act of lifting a load can be monitored and controlled using the automated process. If the conformational movement of the fork lift is in conflict with the predetermined standard, fault detection computer 18 triggers safety control device 24.

Figure 9:
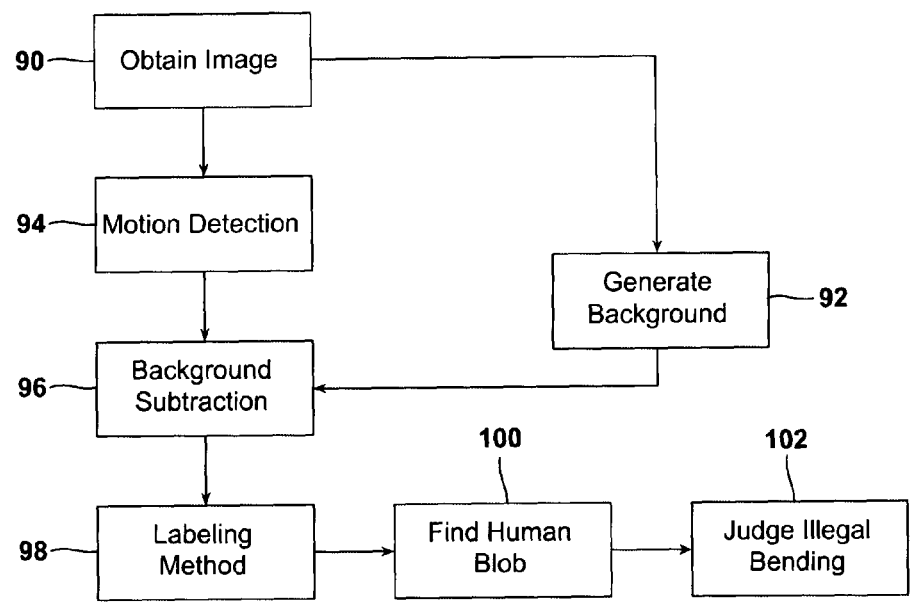
FIG. 9 is a representative schematic of the overall process for detecting and evaluating conformational movements of objects in a production area.

FIG. 9 is a representative schematic of the overall process for detecting and evaluating conformational movements of objects in a production area. The automated process for monitoring and controlling conformational movements in the production area can be carried out using an algorithm consisting of several modules, including a primary algorithm that finds a moving object against a fixed, non-moving background within the production area, a secondary algorithm that uses blob analysis from the image processed in the primary algorithm, and a third algorithm that judges safe conformational movements of objects (or portions of objects) in the production area.

As illustrated in FIG. 9, an image of the production area is obtained (90), and background is generated (92). Conformational motion is detected (94), and the background is subtracted to reveal the objects undergoing conformational motion (96). Features of objects undergoing conformational motion are extracted (98), and an object blob is found (100), and calculations are performed to judge whether the conformational movement exceeds pre-determined limits of conformational movement of safe work practices (102).

As in the detection and evaluation of the speed and velocity of objects in the production area, the image of the production area and the background are obtained by taking images at fixed intervals, using low pass filtering over time, wherein:

$$B(x,y) \leftarrow \tau B(x,y) + (1-\tau)I(x,y)$$

where B(x,y) is background image, I(x,y) is the current image, and τ is a predetermined fixed time constant. Again, motion can be detected using a motion subtraction method. Motion exists if:

$$\Sigma_{(region\ of\ interest)}\{|I_n(x,y)-I_{n-T}(x,y)|\} > threshold$$

Again, background subtraction can be carried out by obtaining an image of objects in the foreground, using:

$$S(x,y)=|I(x,y)-B(x,y)|>th$$

wherein S(x,y) is the foreground image (i.e., a binary image), B(x,y) is the background image, and th is a predetermined threshold value.

The blob analysis can be carried out by obtaining a blob from the binary image. Imaging sensors can continuously capture image data from objects in the production area, and the computer system can include computer-readable program code that is used by the computer to analyze the image data and produce a blob for the object being monitored. The computer can locate the closest blob to a pre-determined object, and associate the blob with the pre-determined object. Features of the blob can include size and aspect ratio, i.e., ratio of horizontal to vertical size.

Figure 10:
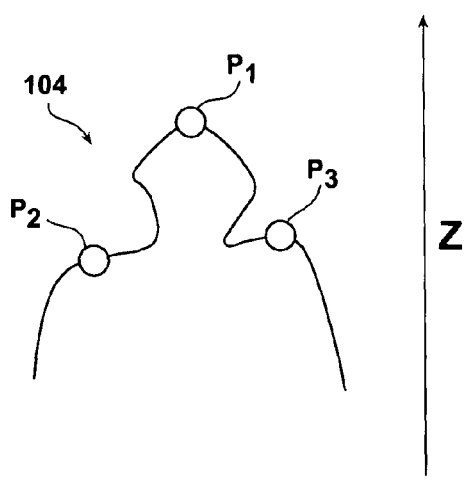
FIG. 10 illustrates a blob image of an individual having a chest and head in a generally upright posture.

FIG. 10 illustrates blob image 104 of an individual having a chest and head in a generally upright posture with the view being a frontal view or a rear view, but not a side view. $P_1$ is the head point and should be the highest point in the blob, having the highest "z-value" in terms of height off the work floor. $P_2$ and $P_3$ are the right and left shoulder points, respectively, with $P_1$ being above but between $P_2$ and $P_3$. $P_2$ and $P_3$ have approximately equal z-values, i.e., approximately equal height off of the work floor.

Figure 11:
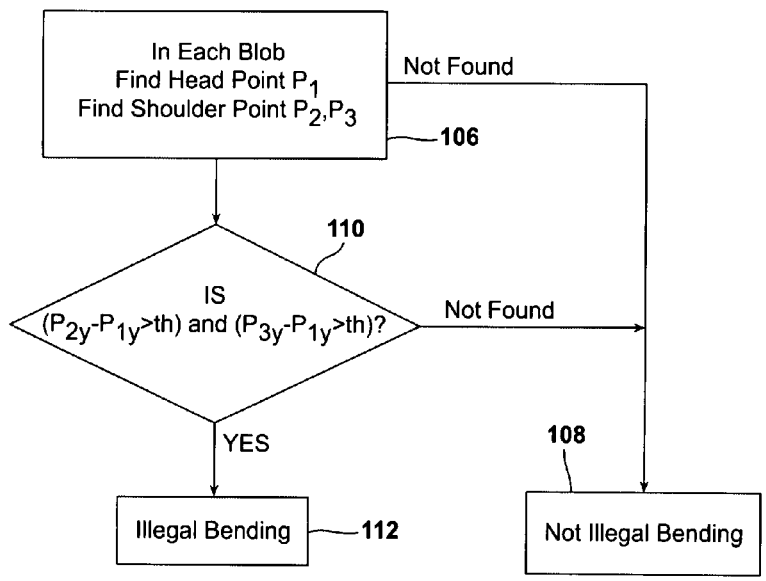
FIG. 11 provides a schematic of the algorithm for analysis of the blob of FIG. 10.

FIG. 11 provides a schematic of the algorithm for analysis of blob 104, i.e., an analysis of whether an individual in the production environment is engaged in a conformational movement (bending, with lifting, or bending without lifting) in a manner that violates a pre-determined safe working practice. Each blob 104 is analyzed to find head point $P_1$ and shoulder points $P_2$ and $P_3$ (106). If $P_1$, $P_2$, and $P_3$ are not found, then unsafe bending is not detected (108). However, if $P_1$, $P_2$, and $P_3$ are found, with $P_{1z}$ representing the height of the head and $P_{2z}$ representing the height of the right shoulder and $P_{3z}$ representing the height of the left shoulder, and th representing a threshold minimum safe distance value, then $P_{1z}$, $P_{2z}$, $P_{3z}$, and th are processed to see if:

$$(P_{1z}-P_{2z}<th)\ and\ (P_{1z}-P_{3z}<th).$$

Figure 12:
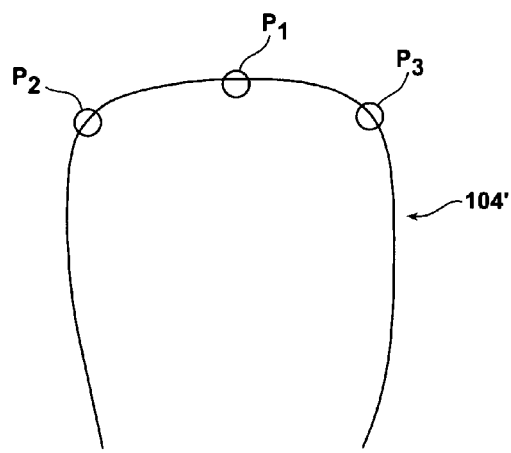
FIG. 12 illustrates blob in an unsafe bending conformation.

If $(P_{1z}-P_{2z}<th)$ and $(P_{1z}-P_{3z}<th)$ is found to be satisfied (110), unsafe bending is detected (112), as the difference in z height between the head and each of the shoulders is smaller than the minimum threshold value th, indicating that the individual is bending too much from the waist so that the height of the head is close to or even less than the height of the shoulders (unsafe posture, particularly for lifting), rather than bending mostly from the knees, which maintains greater relative z height of the head above the z height of the shoulders (safe posture). FIG. 12 illustrates blob 104' in an unsafe bending conformation, in which the values of $P_{1z}$, $P_{2z}$, and $P_{3z}$ are substantially equivalent, indicating that the individual is bent at the waist until the spine is substantially horizontal, and prone to injury upon lifting or straightening upright.

The computed conformation, if left unfiltered, could result in a large number of false positives due to the difficulties of image processing in a production area. As a result, the determination of conformational bending can be filtered in the same manner as described above in FIG. 5 in the monitoring and controlling of the proper wearing of PPE in the production area. More particularly, a data feedback loop can be set up to require the conformation to meet or exceed a threshold value indicating an unsafe conformational movement for a duration meeting or exceeding a threshold time period.

EXAMPLES

As an example, a cutting board is located at a sandwich making station. The sandwich-maker is located at the cutting board and is monitored by a video camera such as a Trendnet® TV IP110 internet camera server network camera, available from RitzCamera.com. The camera sends a visual data wirelessly via a router (e.g., NETGEAR®—RangeMax 802.11g Wireless Router, model WPN824, available from Best Buy, P.O. Box 9312, Minneapolis, Minn. 55440) to a computer (e.g., eMachines—Netbook with Intel® Atom™ Processor, Model: EM250-1915, also available from Best Buy). The computer processes the data in a near real time manner to determine if the sandwich-maker is complying with proper safety protocol in using a knife at the cutting board. The output signal from the computer controls light emitting diodes embedded within the cutting board in the event that the use of the knife is determine to be outside of a safe movement range programmed into the computer. The cutting board, made with food-grade polyethylene, may have light emitting diodes embedded in a corner, overlaid with a translucent printing identifying various forms of movements outside of the safe movement range.

In an environment in which multiple individuals are being monitored via a single camera, the control of lights or other items may require additional identifying symbols to be associated to the individual or item. For example, consider an industrial warehouse setting with multiple forklift operators. A specific individual among many within the field of view of the camera may drive a forklift in an unsafe manner as determined by the computer algorithms operating within the computer that runs the cameras. With an unsafe condition determined, the license plate or an identifying symbol of the vehicle can be obtained from the image in near real time and the code outputted by the computer to the transmission system will communicate only with the light located within the vehicle. The light consisting of a power source such a 12V dc supply, a light emitting diode, and a transistor circuit capable of receiving a wireless signal and an activation relay.

In another example with a system used to detect safe bending practices of an individual, a conveyor belt or table may be fitted with electromechanical grippers that hold a box down and prevent lifting of the object if an operator is violating lifting procedures. In some cases, the brakes on the wheels of push carts may be activated to stop a cart from rolling if an individual is running with the cart in a "walk only" zone.

Once the system has determined that a safety violation has occurred a digital output from the computer is obtained. Typically, a +/−5V or +/−12V output is obtained from the controlling computer using USB, Ethernet, or RS-232 ports. This signal may be further modulated with codes corresponding to the individual in violation, the location or station in violation, or the speed, velocity, acceleration, or conformation data. As an example this signal could be used to drive an operational amplifier transistor circuit and then further control directly a timing, auditory, lighting, or electromechanical circuit. In some cases, the +/−5V or +/−12V electrical output signal could be used to drive a radio frequency transmitter that could modulate a receiving antenna and circuit. This circuit may be selective with regard to which light, auditory signal, electromechanical system, or timing circuit is activated depending on the transmitted codes.

What is claimed is:

1. An automated process for monitoring and controlling safe working practice in a production area, comprising:
    (A) capturing image data of the production area over a time period;
    (B) processing the image data to obtain movement represented as position as a function of time of at least one member selected from the group consisting of an individual in the production area, a tool in the production area, a vehicle in the production area, an article-in-progress in the production area, and a machine in the production area, the processing of the image data utilizing a stabilization algorithm to determine whether the movement is outside of a predetermined safe movement range, wherein the stabilization algorithm processes the image data related to the movement to determine whether the movement has occurred or is currently occurring outside of the predetermined safe movement range for a time period exceeding a threshold time period prior to a current time; and
    (C) activating a safety control device if the movement is outside of the safe movement range for a period exceeding the threshold time period.

2. The automated process according to claim 1, wherein the image data is processed to determine whether at least one member selected from the group consisting of the individual, the tool, the vehicle, the article-in-progress and the machine has moved into a position outside of the safe movement range.

3. The automated process according to claim 1, wherein the image data is processed to determine whether at least one member selected from the group consisting of the individual, the tool, the vehicle, the article-in-progress and the machine is moving at a speed outside of the safe movement range.

4. The automated process according to claim 1, wherein the image data is processed to determine whether at least one member selected from the group consisting of the individual, the tool, the vehicle, the article-in-progress and the machine is moving with an acceleration outside of the safe movement range.

5. The automated process according to claim 1, wherein the image data is captured by scanning at least a portion of the production area with a camera.

6. The automated process according to claim 1, wherein the vehicle is a fork lift.

7. The automated process according to claim 1, wherein the safety control device comprises at least one member selected from group consisting of:
    (i) a power deactivation device for turning off power to at least one member of the group consisting of the tool, the vehicle, the article-in-progress, and the machine;
    (ii) means to control movement of at least one member selected from the group consisting of the machine, the tool, the vehicle, or the article-in-progress;
    (iii) an alarm to notify the individual that the movement is in conflict with the predetermined standard for avoiding injury to the individual or other individuals in the production area, or avoiding damage to the tool, the vehicle, the article-in-progress, or the machine;
    (iv) a report that the movement is outside of the safe movement range for a time period exceeding the threshold time period.

8. The automated process according to claim 7, wherein the safety control device comprises at least one member selected from the group consisting of an audible alarm, a visual alarm, and a vibratory alarm.

9. The automated process according to claim 1, wherein the safety control device comprises a report including an image of at least one member selected from the group consisting of the individual, the tool, the vehicle, the article-in-progress and the machine, while the at least one member selected from the group consisting of the individual, tool, vehicle, article-in-progress, or machine exhibits movement outside of the safe movement range for a period exceeding the threshold time period.

10. The automated process according to claim 9, wherein the report further comprises a notation of a time of capture of the image of the at least one member selected from the group consisting of the individual, the tool, the vehicle, the article-in progress and the machine.

11. The automated process according to claim 9, further comprising the transmission of the report, with the transmission of the report comprising at least one member selected from the group consisting of transmission of an electronic report and transmission of a hard copy report.

12. The automated process according to claim 1, wherein at least one member selected from the individual, machine, tool, or article-in-progress has an RFID tag thereon.

13. An automated process for monitoring and controlling safe working practice in a production area, comprising:
    (A) capturing image data of the production area over a time period;
    (B) processing the image data to determine conformation, over the time period, of at least one member selected from the group consisting of an individual in the production area, a tool in the production area, a vehicle in the production area, an article-in-progress in the production area, and a machine in the production area, the processing of the image data utilizing a stabilization algorithm to determine whether the image data satisfy a threshold conformation value for a threshold time period, with the threshold conformation value being a predetermined minimum conformation value correlating to an unsafe conformation of at least one member selected from the group consisting of the individual, the tool, the vehicle, the article-in-progress, and the machine, the threshold time period being a pre-determined minimum time period prior to a current time that the threshold image value is satisfied; and
    (C) activating a safety control device if the threshold conformation value is satisfied for the threshold time period.

14. The automated process according to claim 13, wherein the image data is captured by scanning at least a portion of the production area with a camera.

15. The automated process according to claim 13, wherein the vehicle is a fork lift, and the threshold conformation value comprises a lift height value.

16. The automated process according to claim 15, wherein the threshold conformation value comprises a combination of the lift height value and a load size value.

17. The automated process according to claim 13, wherein activating the safety control device comprises at least one member selected from group consisting of:
    (i) activating a power deactivation device for turning off power to at least one member of the group consisting of the vehicle, the tool, the article-in-progress, and the machine;
    (ii) activating a means to limit further conformational movement past the threshold conformation value;
    (iii) an alarm to notify one or more individuals in the production area that the threshold conformation value has been exceeded for the threshold time period;
    (iv) a report that the threshold conformation value has been met for the threshold time period.

18. The automated process according to claim 14, wherein the alarm comprises at least one member selected from the group consisting of an audible alarm, a visual alarm, and a vibratory alarm.

19. The automated process according to claim 17, wherein the report comprises an image of at least one member selected from the group consisting of the individual, the vehicle, the tool, the article-in-progress, and the machine, while the at least one member selected from the group consisting of the individual, tool, vehicle, article-in-progress, or machine satisfies the threshold conformation value for the threshold time period.

20. The automated process according to claim 17, further comprising transmitting the report to a recipient, with the report comprising at least one member selected from the group consisting of an electronic report and a hard copy report.

21. The automated process according to claim 13, wherein at least one member selected from the individual, the vehicle, the tool, the article-in-progress, and the machine has an RFID tag thereon.

22. The automated process according to claim 13, comprising capturing image data of an individual lifting an object, with images of the conformation of the individual during lifting being processed to determine whether the conformation of the individual during lifting satisfies the threshold conformation value for the threshold time period.

23. An automated system for monitoring and controlling safe working practice in a production area, the system comprising:
(A) a computer;
(B) an imaging sensor in communication with the computer, the imaging sensor being configured and arranged to capture image data from the production area over a time period;
(C) a safety control device; and
(D) a computer-readable program code disposed on the computer, the computer readable program code comprising:
(i) a first executable portion for processing image data to determine movement of at least one member selected from the group consisting of an individual in the production area, a tool in the production area, a vehicle in the production area, an article-in-progress in the production area, and a machine in the production area, the movement being determined from image data providing position as a function of time;
(ii) a second executable portion for processing the image data to determine whether the movement is outside a predetermined safe movement range for a time period prior to a current time in excess of a threshold time period; and
(iii) a third executable portion for activating the safety control device if the movement is outside of the safe movement range for a time exceeding the threshold time period.

24. The automated system according to claim 23, wherein image data includes an image of the individual driving the vehicle in the production area, with the movement including movement of both the individual and the movement of the vehicle.

25. The automated system according to claim 23, wherein the image data includes an image of the individual using the tool, with the movement including movement of both the individual and movement of the tool.

26. The automated system according to claim 23, wherein the image data includes an image of the individual using the machine, with the movement including movement of both the individual and at least a portion of the machine.

27. The automated system according to claim 23 wherein the imaging sensor is a scanning imaging sensor configured and arranged to scan a production area to capture image data over a period of time.

28. An automated system for monitoring and controlling safe working practice in a production area, the system comprising:
(A) a computer;
(B) an imaging sensor in communication with the computer, the imaging sensor being configured and arranged to capture image data from the production area over a time period;
(C) a safety control device; and
(D) a computer-readable program code disposed on the computer, the computer readable program code comprising:
(i) a first executable portion for processing image data to determine conformation, over the time period, of at least one member selected from the group consisting of an individual in the production area, a tool in the production area, a vehicle in the production area, an article-in-progress in the production area, and a machine in the production area, the processing of the image data utilizing a stabilization algorithm to determine whether the image data satisfy a threshold conformation value, with the threshold conformation value being a predetermined minimum conformation value correlating to an unsafe conformation of at least one member selected from the group consisting of the individual, the tool, the vehicle, the article-in-progress, and the machine;
(ii) a second executable portion for processing the image data to determine whether the threshold conformation value is met for a threshold time period prior to a current time, the threshold time period being a predetermined minimum time period that the threshold image value is satisfied; and
(iii) a third executable portion for activating the safety control device if the movement satisfies the threshold conformation value for the threshold time period.

* * * * *